United States Patent
Nguyen et al.

(10) Patent No.: US 12,120,321 B2
(45) Date of Patent: Oct. 15, 2024

(54) REFINED BLOCK-BASED PREDICTIVE CODING AND DECODING OF A PICTURE

(71) Applicant: Fraunhofer-Gesellschaft zur Förderung der angewandten Forschung e.V., Munich (DE)

(72) Inventors: Phan Hoang Tung Nguyen, Berlin (DE); Gerhard Tech, Berlin (DE); Jonathan Pfaff, Berlin (DE); Michael Schäfer, Berlin (DE); Jennifer Rasch, Berlin (DE); Tobias Hinz, Berlin (DE); Heiko Schwarz, Berlin (DE); Detlev Marpe, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 239 days.

(21) Appl. No.: 17/036,828

(22) Filed: Sep. 29, 2020

(65) Prior Publication Data
US 2021/0084313 A1 Mar. 18, 2021

Related U.S. Application Data

(63) Continuation of application No. PCT/EP2019/057896, filed on Mar. 28, 2019.

(30) Foreign Application Priority Data

Mar. 29, 2018 (EP) .................... 18165042

(51) Int. Cl.
*H04N 19/174* (2014.01)
*H04N 19/176* (2014.01)

(52) U.S. Cl.
CPC ......... *H04N 19/174* (2014.11); *H04N 19/176* (2014.11)

(58) Field of Classification Search
CPC ..... H04N 19/176; H04N 19/174; H04N 19/82
See application file for complete search history.

(56) References Cited

U.S. PATENT DOCUMENTS

| | | | |
|---|---|---|---|
| 5,787,209 A | 7/1998 | Konstantinides et al. | |
| 2007/0092002 A1* | 4/2007 | Xue | G06T 5/00 375/E7.193 |

(Continued)

FOREIGN PATENT DOCUMENTS

| | | |
|---|---|---|
| WO | 2008/048489 A2 | 4/2008 |
| WO | 2017/133660 A1 | 8/2017 |
| WO | 2018/127418 A1 | 7/2018 |

*Primary Examiner* — Zhubing Ren
(74) *Attorney, Agent, or Firm* — NIXON & VANDERHYE P.C.

(57) ABSTRACT

The refinement of block-based predictive coding and decoding of pictures as applicable in, e.g., hybrid video codecs, using additional reconstructed samples or residuals is described. An apparatus for block-based predictive decoding of a picture is described. The apparatus includes a combiner configured to combine a residual signal a predetermined block of the picture and a reference signal for the predetermined block so as to obtain a first spectrum, the residual signal correcting a prediction error of a prediction of the predetermined block of the picture; a reducer configured to perform thresholding on the first spectrum to obtain a second spectrum so that coefficients below a threshold value are set to a predefined value; an extractor configured to obtain from the second spectrum a modified version of the residual signal; and a reconstructor block configured to decode the predetermined block of the picture from the data stream on the basis of the modified version of the residual signal.

14 Claims, 14 Drawing Sheets

(56) References Cited

U.S. PATENT DOCUMENTS

| | | | |
|---|---|---|---|
| 2009/0238276 A1* | 9/2009 | Har-Noy | H04N 19/82 |
| | | | 375/240.13 |
| 2016/0173884 A1* | 6/2016 | Le Leannec | H04N 19/147 |
| | | | 382/166 |
| 2019/0182482 A1* | 6/2019 | Vanam | H04N 19/132 |
| 2019/0208223 A1* | 7/2019 | Galpin | H04N 19/139 |
| 2020/0162729 A1* | 5/2020 | Lee | H04N 19/18 |
| 2021/0297680 A1* | 9/2021 | Wang | H04N 19/50 |

\* cited by examiner

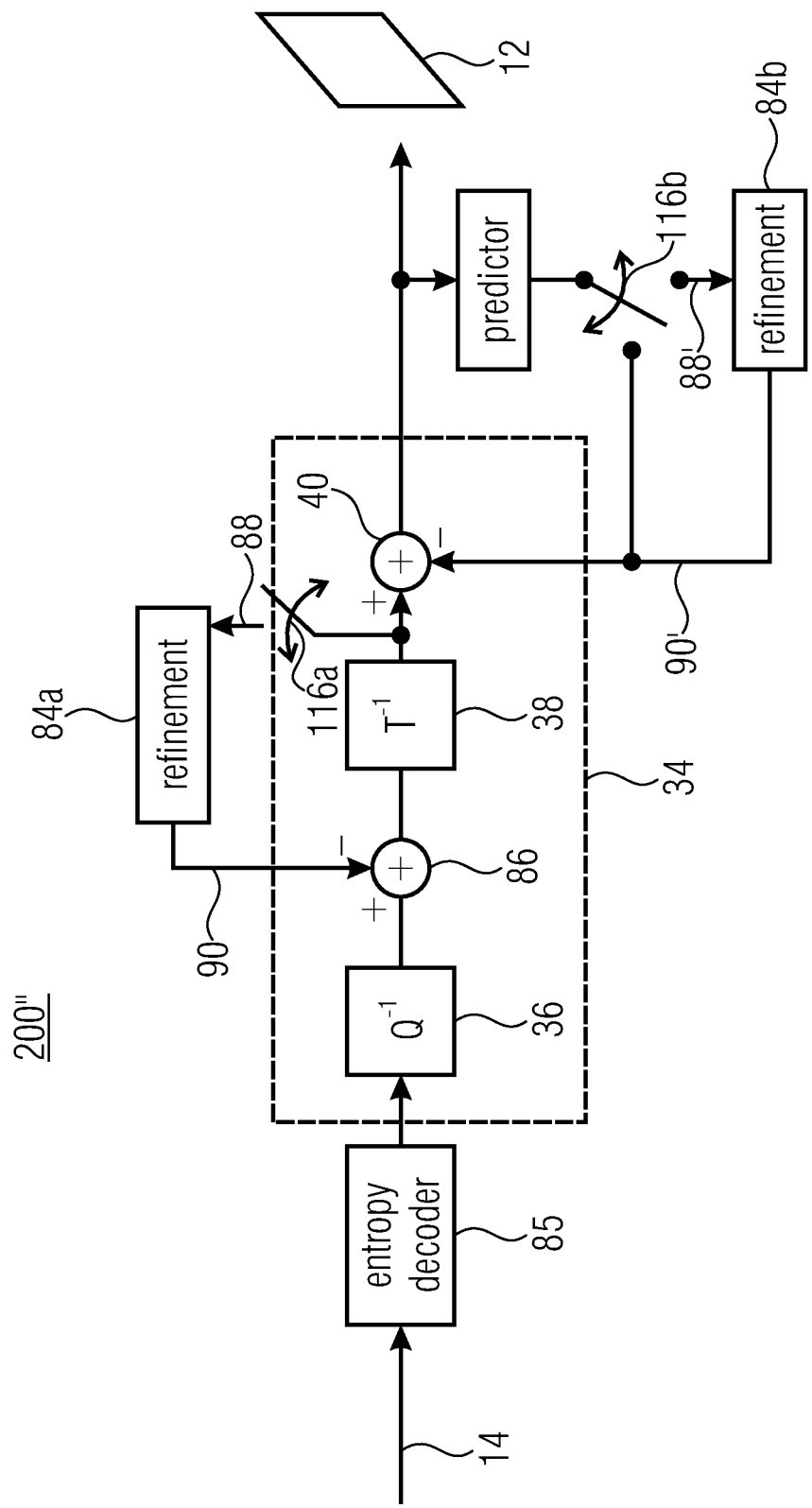

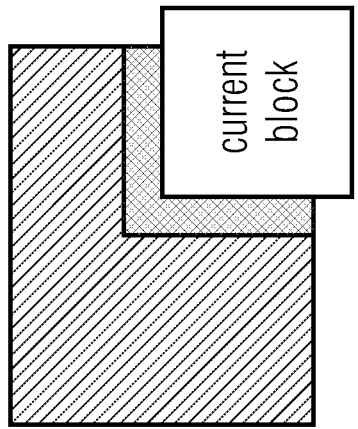
Fig. 12A  Fig. 12B  Fig. 12C
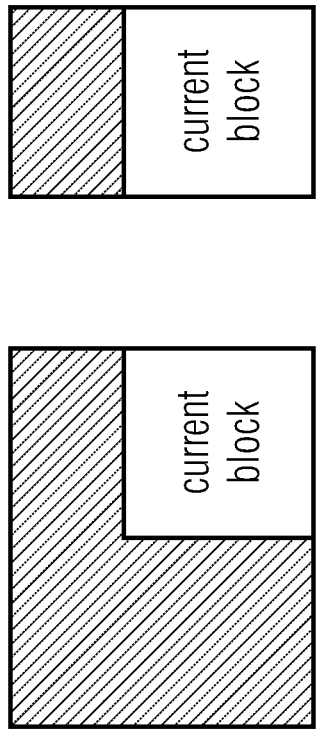
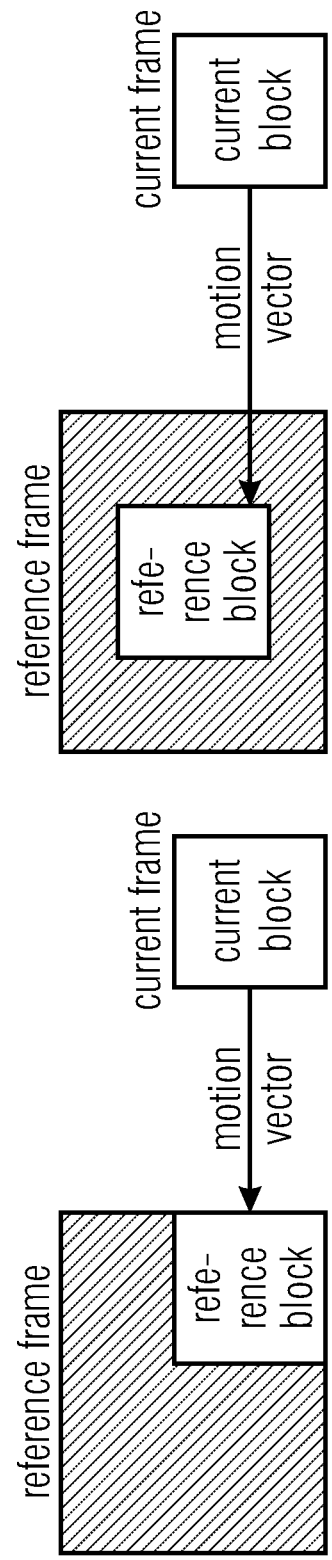
Fig. 13A  Fig. 13B

REFINED BLOCK-BASED PREDICTIVE CODING AND DECODING OF A PICTURE

CROSS-REFERENCES TO RELATED APPLICATIONS

This application is a continuation of copending International Application No. PCT/EP2019/057896, filed Mar. 28, 2019, which is incorporated herein by reference in its entirety, and additionally claims priority from European Application No. EP 18 165 042.5, filed Mar. 29, 2018, which is incorporated herein by reference in its entirety.

BACKGROUND OF THE INVENTION

The present invention relates to the field of encoding/decoding pictures, images or videos. Embodiments of the inventive approach concern the refinement of block-based predictive coding and decoding of pictures such as applicable in hybrid video codecs, for example. More specific embodiments of the inventive approach relate to various aspects for a refinement using additional reconstructed samples or residuals.

Nowadays many video codecs and still picture codecs use block-based predictive coding to compress the data used to represent the picture content. The better the prediction is, the lower the data needed to code the prediction residual. The overall benefit from using prediction depends on the amount of data needed to keep the prediction synchronized between the encoder and the decoder, i.e., the data needed for prediction parameterization. An example for block-based predictive coding and decoding of pictures such as applicable in hybrid video codecs is described in international patent application PCT/EP2017/083789, "Block-Based Predictive Coding and Decoding of a Picture" filed on Dec. 20, 2017, which is hereby incorporated by reference.

SUMMARY

According to an embodiment, an apparatus for block-based predictive decoding of a picture may have: a combiner configured to combine a residual signal of a predetermined block of the picture and a reference signal for the predetermined block so as to obtain a first set of coefficients, the residual signal correcting a prediction error of a prediction of the predetermined block of the picture; a reducer configured to perform thresholding on the first set of coefficients to obtain a second set of coefficients so that coefficients below a threshold value are set to a predefined value; an extractor configured to obtain from the second set of coefficients a modified version of the residual signal; and a reconstructor block configured to decode the predetermined block of the picture from the data stream on the basis of the modified version of the residual signal.

According to another embodiment, an apparatus for block-based predictive decoding of a picture may have: an decoding block configured to decode a residual signal from a data stream, the residual signal correcting a prediction error of a prediction signal for a predetermined block of the picture; and a comparator configured to compare, for each coefficient position within a reference signal for the predetermined block, a coefficient against a threshold value, and if the coefficient value is below the threshold, set, at the corresponding coefficient position within an employed signal, the coefficient to a predefined value, thereby obtaining a modified employed signal, wherein the employed signal includes the prediction signal and/or the residual signal; the decoding block configured to decode the predetermined block from the data stream on the basis of the modified employed signal.

According to another embodiment, an apparatus for block-based predictive decoding of a picture may have: a reconstructor block configured to decode a predetermined block of a picture from a data stream on the basis of a residual signal, the residual signal correcting a prediction error of a prediction of a predetermined block of the picture; a prediction provider configured to provide the prediction of the predetermined block of the picture; a first refinement block for a refinement of the prediction of the predetermined block of the picture; and a second refinement block for a refinement of the residual signal.

According to another embodiment, an apparatus for block-based predictive decoding of a picture may have: a prediction provider configured to predict a predetermined block of the picture to obtain a first version of a prediction signal for the predetermined block; a decomposer configured to perform a transform a region composed of the first version of the prediction signal and a reference signal for the predetermined block so as to obtain a first set of coefficients of the region; a reducer configured to perform thresholding on the first set of coefficients to obtain a second set of coefficients so that coefficients below a threshold value are set to a predefined value, the threshold value based on the coefficients for the first version of the prediction signal or on the coefficients for the reference signal or on the coefficients for a combined signal including the prediction signal and the reference signal; a composer configured to subject the second set of coefficients to a re-transform so as to obtain a modified version of the region including a second version of the prediction signal; and a reconstructor block configured to decode the predetermined block of the picture from the data stream on the basis of the second version of the prediction signal.

According to another embodiment, an apparatus for block-based predictive decoding of a picture may have: a prediction provider configured to predict a predetermined block of the picture to obtain a first version of a prediction signal for the predetermined block; a decomposer configured to perform a transform a region composed of the first version of the prediction signal and a reference signal for the predetermined block so as to obtain a first set of coefficients of the region; a reducer configured to perform thresholding on the first set of coefficients to obtain a second set of coefficients so that coefficients below a threshold value are set to a predefined value; a composer configured to subject the second set of coefficients to a re-transform so as to directly obtain a second version of the prediction signal; and a reconstructor block configured to decode the predetermined block of the picture from the data stream on the basis of the second version of the prediction signal.

According to another embodiment, an apparatus for block-based predictive decoding of a picture may have: a prediction provider configured to predict a predetermined block of the picture to obtain a first version of a prediction signal for the predetermined block; a decomposer configured to perform a transform a region composed of the first version of the prediction signal and a reference signal for the predetermined block so as to obtain a first set of coefficients of the region; a reducer configured to perform thresholding on the first set of coefficients to determine coefficients below a threshold value; a composer configured to subject the first set of coefficients to a re-transform so as to obtain a modified version of the region including a second version of the prediction signal, wherein coefficient positions having amplitudes below the threshold value are not considered in the composition; and a reconstructor block configured to decode the predetermined block of the picture from the data stream on the basis of the second version of the prediction signal.

According to another embodiment, an apparatus for block-based predictive encoding of a picture may have: an encoding block configured to encode a residual signal into a data stream, the residual signal correcting a prediction error of a prediction of a predetermined block of the picture; a combiner configured to combine the residual signal and a reference signal for the predetermined block so as to obtain a first set of coefficients; a reducer configured to perform thresholding on the first set of coefficients to obtain a second set of coefficients so that coefficients below a threshold value are set to a predefined value; and an extractor configured to obtain from the second set of coefficients a modified version of the residual signal; the encoding block configured to encode the predetermined block into the data stream on the basis of the modified version of the residual signal.

According to another embodiment, an apparatus for block-based predictive encoding of a picture may have: an encoding block configured to encode a residual signal into a data stream, the residual signal correcting a prediction error of a prediction signal for a predetermined block of the picture; and a comparator configured to compare, for each coefficient position within a reference signal for the predetermined block, a coefficient against a threshold value, and if the coefficient value is below the threshold, set, at the corresponding coefficient position within an employed signal, the coefficient to a predefined value, thereby obtaining a modified employed signal, wherein the employed signal includes the prediction signal and/or the residual signal; the encoding block configured to encode the predetermined block into the data stream on the basis of the modified employed signal.

According to another embodiment, an apparatus for block-based predictive encoding of a picture may have: an encoding block configured to encode a residual signal into a data stream, the residual signal correcting a prediction error of a prediction of a predetermined block of the picture; a prediction provider configured to provide the prediction of the predetermined block of the picture; a first refinement block for a refinement of the prediction of the predetermined block of the picture; and a second refinement block for a refinement of the residual signal.

According to another embodiment, an apparatus for block-based predictive encoding of a picture may have: a prediction provider configured to predict a predetermined block of the picture to obtain a first version of a prediction signal for the predetermined block; a decomposer configured to perform a transform of a region composed of the first version of the prediction signal and a reference signal for the predetermined block so as to obtain a first set of coefficients of the region; a reducer configured to perform thresholding on the first set of coefficients to obtain a second set of coefficients so that coefficients below a threshold value are set to a predefined value, the threshold value based on the coefficients for the first version of the prediction signal or on the coefficients for the reference signal or on the coefficients for a combined signal including the prediction signal and the reference signal; a composer configured to subject the second set of coefficients to a re-transform so as to obtain a modified version of the region including a second version of the prediction signal; and an encoding block configured to encode the predetermined block into a data stream on the basis of the second version of the prediction signal.

According to another embodiment, an apparatus for block-based predictive encoding of a picture may have: a prediction provider configured to predict a predetermined block of the picture to obtain a first version of a prediction signal for the predetermined block; a decomposer configured to perform a transform of a region composed of the first version of the prediction signal and a reference signal for the predetermined block so as to obtain a first set of coefficients of the region; a reducer configured to perform thresholding on the first set of coefficients to obtain a second set of coefficients so that coefficients below a threshold value are set to a predefined value; a composer configured to subject the second set of coefficients to a re-transform so as to directly obtain a second version of the prediction signal; and an encoding block configured to encode the predetermined block into a data stream on the basis of the second version of the prediction signal.

According to another embodiment, an apparatus for block-based predictive encoding of a picture may have: a prediction provider configured to predict a predetermined block of the picture to obtain a first version of a prediction signal for the predetermined block; a decomposer configured to perform a transform a region composed of the first version of the prediction signal and a reference signal for the predetermined block so as to obtain a first set of coefficients of the region; a reducer configured to perform thresholding on the first set of coefficients to determine coefficients below a threshold value; a composer configured to subject the first set of coefficients to a re-transform so as to obtain a modified version of the region including a second version of the prediction signal, wherein coefficient positions having amplitudes below the threshold value are not considered in the composition; and an encoding block configured to encode the predetermined block into a data stream on the basis of the second version of the prediction signal.

According to another embodiment, a method for block-based predictive decoding of a picture may have the steps of: combining a residual signal a predetermined block of the picture and a reference signal for the predetermined block so as to obtain a first set of coefficients, the residual signal correcting a prediction error of a prediction of the predetermined block of the picture; performing thresholding on the first set of coefficients to obtain a second set of coefficients so that coefficients below a threshold value are set to a predefined value; obtaining from the second set of coefficients a modified version of the residual signal; and decoding the predetermined block of the picture from the data stream on the basis of the modified version of the residual signal.

According to another embodiment, a method for block-based predictive decoding of a picture may have the steps of: decoding a residual signal from a data stream, the residual signal correcting a prediction error of a prediction signal for a predetermined block of the picture; and comparing, for each coefficient position within a reference signal for the predetermined block, a coefficient against a threshold value; and if the coefficient value is below the threshold, setting, at the corresponding coefficient position within an employed signal, the coefficient to the predefined value, thereby obtaining a modified employed signal, wherein the employed signal includes the prediction signal and/or the residual signal; wherein the decoding includes decoding the predetermined block from the data stream on the basis of the modified employed signal.

According to another embodiment, a method for block-based predictive decoding of a picture may have the steps of: providing a prediction of a predetermined block of the picture; decoding the predetermined block of a picture from a data stream on the basis of a residual signal, the residual signal correcting a prediction error of the prediction of the predetermined block of the picture; and refining the prediction of the predetermined block of the picture and/or the residual signal.

According to another embodiment, a method for block-based predictive decoding of a picture may have the steps of: predicting a predetermined block of the picture to obtain a first version of a prediction signal for the predetermined block; performing a transform on a region composed of the first version of the prediction signal and a reference signal for the predetermined block so as to obtain a first set of coefficients of the region; performing thresholding on the first set of coefficients to obtain a second set of coefficients so that coefficients below a threshold value are set to a predefined value, the threshold value based on the coefficients for the first version of the prediction signal or on the coefficients for the reference signal; subjecting the first set of coefficients to a re-transform so as to obtain a modified version of the region including a second version of the prediction signal; and decoding the predetermined block of the picture from the data stream on the basis of the second version of the prediction signal.

According to another embodiment, a method for block-based predictive decoding of a picture may have the steps of: predicting a predetermined block of the picture to obtain a first version of a prediction signal for the predetermined block; performing a transform on a region composed of the first version of the prediction signal and a reference signal for the predetermined block so as to obtain a first set of coefficients of the region; performing thresholding on the first set of coefficients to obtain a second set of coefficients so that coefficients below a threshold value are set to a predefined value; subjecting the second set of coefficients to a re-transform so as to directly obtain a second version of the prediction signal; and decoding the predetermined block of the picture from the data stream on the basis of the second version of the prediction signal.

According to another embodiment, a method for block-based predictive decoding of a picture may have the steps of: predicting a predetermined block of the picture to obtain a first version of a prediction signal for the predetermined block; performing a transform on a region composed of the first version of the prediction signal and a reference signal for the predetermined block so as to obtain a first set of coefficients of the region; performing thresholding on the first set of coefficients to determine coefficients below a threshold value; subjecting the first set of coefficients to a re-transform so as to obtain a modified version of the region including a second version of the prediction signal, wherein coefficient positions having amplitudes below the threshold value are not considered in the composition; and decoding the predetermined block of the picture from the data stream on the basis of the second version of the prediction signal.

An method for block-based predictive encoding of a picture may have the steps of: encoding a residual signal into a data stream, the residual signal correcting a prediction error of a prediction of a predetermined block of the picture; combining the residual signal and a reference signal for the predetermined block so as to obtain a first set of coefficients; performing thresholding on the first set of coefficients to obtain a second set of coefficients so that coefficients below a threshold value are set to a predefined value; and obtaining from the second set of coefficients a modified version of the residual signal; wherein encoding includes encoding the predetermined block into the data stream on the basis of the modified version of the residual signal.

According to another embodiment, a method for block-based predictive encoding of a picture may have the steps of: encoding a residual signal into a data stream, the residual signal correcting a prediction error of a prediction signal for a predetermined block of the picture; comparing, for each coefficient position within a reference signal for the predetermined block, a coefficient against a threshold value; and if the coefficient value is below the threshold, setting, at the corresponding coefficient position within an employed signal, the coefficient to the predefined value, thereby obtaining a modified employed signal, wherein the employed signal includes the prediction signal and/or the residual signal; wherein the encoding includes encoding the predetermined block into the data stream on the basis of the modified employed signal.

An method for block-based predictive encoding of a picture may have the steps of: encoding a residual signal into a data stream, the residual signal correcting a prediction error of a prediction of a predetermined block of the picture; providing the prediction of the predetermined block of the picture; refining the prediction of the predetermined block of the picture and/or the residual signal.

According to another embodiment, a method for block-based predictive encoding of a picture may have the steps of: predicting a predetermined block of the picture to obtain a first version of a prediction signal for the predetermined block; performing a transform on a region composed of the first version of the prediction signal and a reference signal for the predetermined block so as to obtain a first set of coefficients of the region; performing thresholding on the first set of coefficients to obtain a second set of coefficients so that coefficients below a threshold value are set to a predefined value, the threshold value based on the coefficients for the first version of the prediction signal or on the coefficients for the reference signal; subjecting the second set of coefficients to a re-transform so as to obtain a modified version of the region including a second version of the prediction signal; and encoding the predetermined block into a data stream on the basis of the second version of the prediction signal.

According to another embodiment, a method for block-based predictive encoding of a picture may have the steps of: predicting a predetermined block of the picture to obtain a first version of a prediction signal for the predetermined block; performing a transform on a region composed of the first version of the prediction signal and a reference signal for the predetermined block so as to obtain a first set of coefficients of the region; performing thresholding on the first set of coefficients to obtain a second set of coefficients so that coefficients below a threshold value are set to a predefined value; subjecting the second set of coefficients to a re-transform so as to directly obtain a second version of the prediction signal; and encoding the predetermined block into a data stream on the basis of the second version of the prediction signal.

According to another embodiment, a method for block-based predictive encoding of a picture may have the steps of: predicting a predetermined block of the picture to obtain a first version of a prediction signal for the predetermined block; performing a transform on a region composed of the first version of the prediction signal and a reference signal for the predetermined block so as to obtain a first set of coefficients of the region; performing thresholding on the first set of coefficients to determine coefficients below a threshold value; subjecting the first set of coefficients to a base re-transform so as to obtain a modified version of the region including a second version of the prediction signal, wherein coefficient positions having amplitudes below the threshold value are not considered in the composition; and encoding the predetermined block into a data stream on the basis of the second version of the prediction signal.

A non-transitory digital storage medium having a computer program stored thereon to perform methods according to the invention when said computer program is run by a computer.

A data stream having a picture encoded thereinto, the data stream being generated by methods according to the invention.

BRIEF DESCRIPTION OF THE DRAWINGS

Embodiments of the present invention will be detailed subsequently referring to the appended drawings, in which:

FIGS. 8A-C illustrates embodiments for implementing the refinement block of the apparatus for block-based predictive encoding of FIG. 1 or FIG. 7, wherein FIG. 8A illustrates an embodiment of the refinement block, FIG. 8B illustrates a another embodiment for implementing the refinement block, and FIG. 8C illustrates yet another embodiment for implementing the refinement block;

FIG. 11 shows a block diagram of a decoding apparatus fitting to the apparatus of FIG. 9;

FIGS. 12A-C illustrates embodiments for areas from which the reference signals may be obtained, wherein FIG. 12A illustrates an embodiment in accordance with which the reference signal is an extension of the current block without offset, FIG. 12B illustrates an embodiment in accordance with which the reference signal is the extension to the top of the current block, and FIG. 12C illustrates an embodiment in accordance with which the reference signal is an extension having an offset relative to the current block.

FIGS. 13A-B illustrates further embodiments for areas surrounding a reference block instead of the current block from which the reference signals may be obtained, wherein FIG. 13A illustrates the use of an extension of a reference block instead of the current block, and FIG. 13B illustrates an embodiment in which the reference signal completely surrounds the reference block.

DETAILED DESCRIPTION OF THE INVENTION

Embodiments of the present invention are now described in more detail with reference to the accompanying drawings in which the same or similar elements have the same reference signs assigned.

Figure 1:
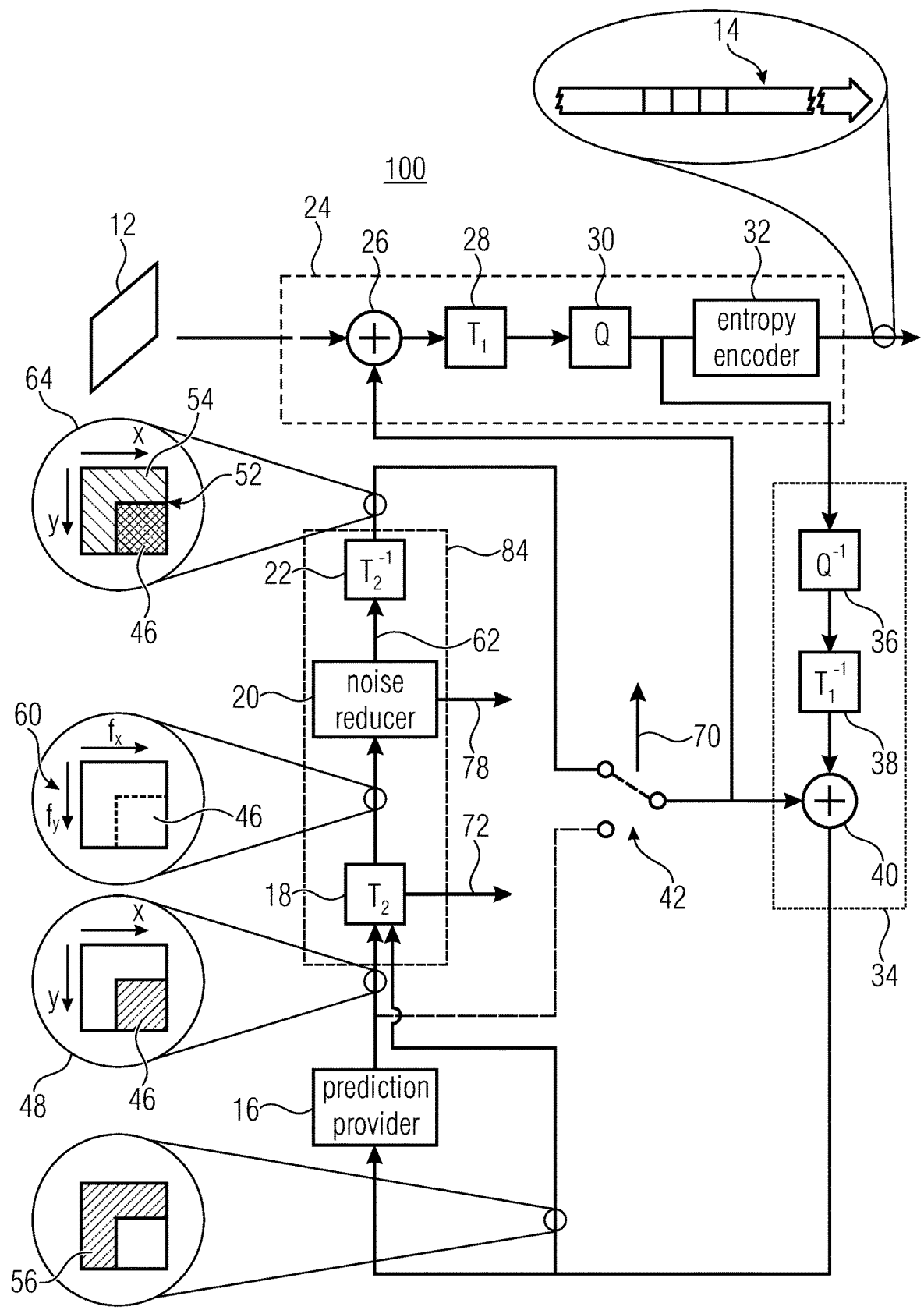
FIG. 1 shows a block diagram of an encoding apparatus illustrating an example for block-based predictive coding of pictures.

FIG. 1 shows an apparatus 100 for block-based predictive encoding of a picture 12 into a data stream 14, as described, e.g., in PCT/EP2017/083789. The apparatus of FIG. 1 comprises a prediction provider 16, a spectral decomposer 18, a noise reducer 20, a spectral composer 22 and an encoding stage 24. The spectral decomposer 18, the noise reducer 20 and the spectral composer 22 may also be referred to as a refinement block 84 of the encoder. In a manner outlined in more detail below, these components 16 to 24 are serially connected into a prediction loop of the encoder 100 in the order of their mentioning. For illustration purposes, FIG. 1 indicates that, internally, the encoding stage 24 may comprise an adder 26, a transformer 28 and a quantization stage or a quantizer 30 serially connected in the aforementioned prediction loop along the order of their mentioning. In particular, an inverting input of the adder 26 is connected to an output of the spectral composer 22, either directly or indirectly via a selector as further outlined below, while a non-inverting input of the adder 26 receives the signal to be encoded, i.e., the picture 12. As further indicated in FIG. 1, the encoding stage 24 may further comprise an entropy encoder 32 connected between the output of the quantizer 30 and an output of the apparatus 100 at which the coded data stream 14 representing the picture 12 is output. As further illustrated in FIG. 1, the apparatus 100 may comprise, connected between the encoding stage 24 and the prediction provider 16 along the aforementioned prediction loop, a reconstruction stage 34 which provides to the prediction provider 16 previously encoded portions, i.e., portions of the picture 12 or a video to which the picture 12 belongs, which have previously been encoded by the encoder 100, and in particular, a version of these portions which is reconstructable at the decoder side even taking the coding loss into account introduced by the quantization within the quantization stage 30. As illustrated in FIG. 1, the reconstruction stage 34 may comprise a dequantizer 36, an inverse transformer 38 and an adder 40 sequentially connected into the aforementioned prediction loop in the order of their mentioning, wherein the dequantizer's input is connected to the quantizer's output. In particular, an output of the adder 40 is connected to an input of the prediction provider 16 and, additionally, a further input of the spectral decomposer 18, present in addition to an input of the spectral decomposer 18 connected to the output of the prediction provider 16 as outlined in more detail below. While a first input of the adder 40 is connected to the output of the inverse transformer 38, a further input of the adder 40 receives, directly or—optionally—indirectly, a final prediction signal via the output of the spectral composer 22. As depicted in FIG. 1, optionally, the encoder 100 comprises a selector 42 configured to select between applying the prediction signal output by the spectral composer 22 to the respective input of the adder 40, or the output of the prediction provider 16.

After having explained the internal structure of the encoder 100, it should be noted that the implementation of the encoder 100, as well as the implementation of the decoder structures and further encoder structures, may be done in software, firmware or hardware or any combination thereof. Any block or module shown in FIG. 1 and the following figures may, accordingly, correspond to a certain portion of a computer program running on a computer, a certain portion of a firmware such as a field programmable array, or a certain portion of an electronic circuit such as an application-specific IC.

Figure 2:
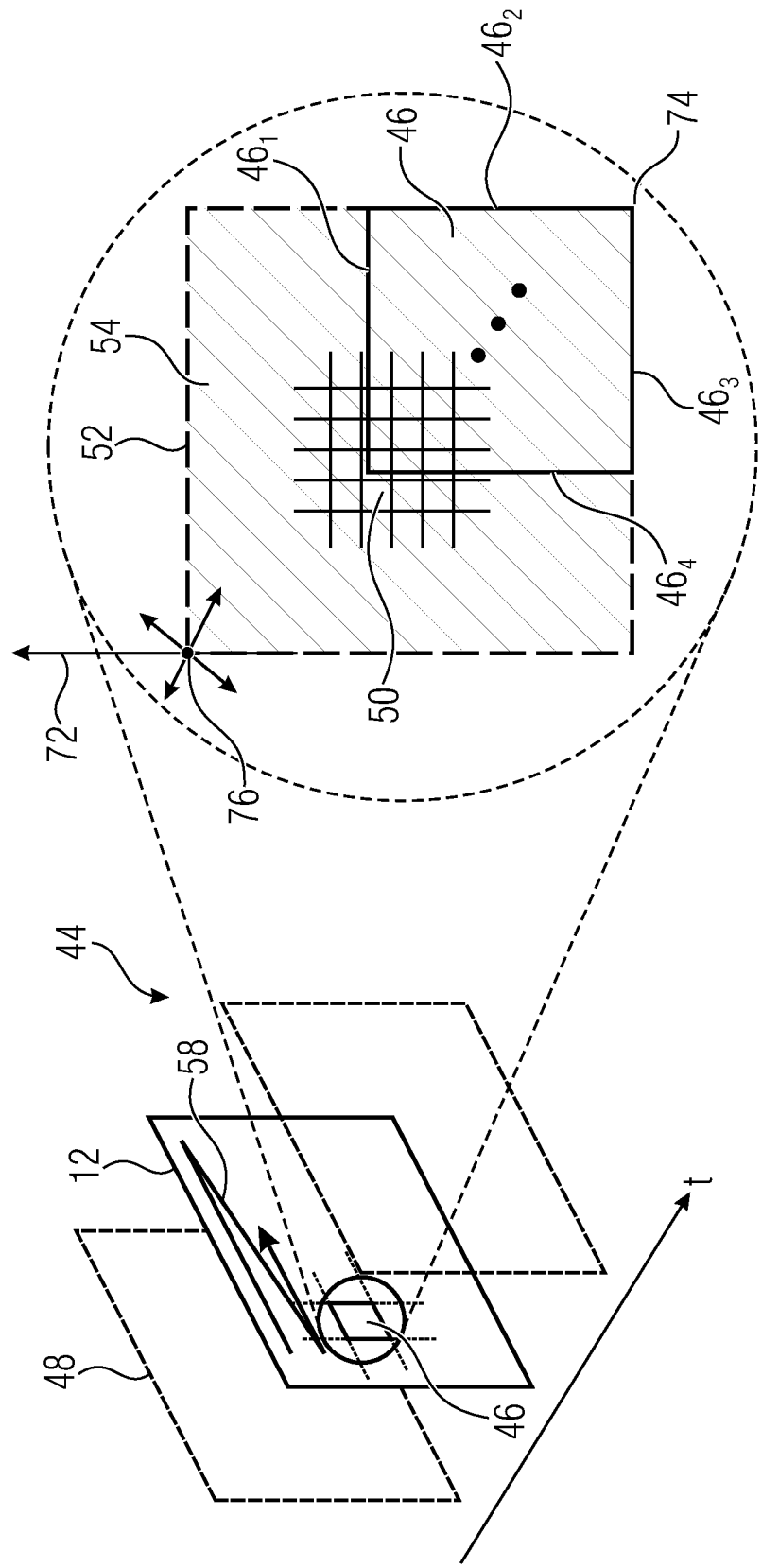
FIG. 2 shows a schematic diagram illustrating on the left a picture which contains blocks to be predicted, and illustrating on the right a block currently to be predicted and how same is extended so as to result into a region which is then the starting point for achieving an alternative version of a prediction, like a predicted filling, for the extended block.

The apparatus 100 of FIG. 1 is configured to encode the picture 12 into the data stream 14 using block-based prediction. Accordingly, on this block-basis, the prediction provider 16 and the subsequent modules 18, 20 and 22, operate. The block 46 in FIG. 2 is such a prediction block. However, the apparatus 100 may operate on a block-basis also with respect to other tasks. For instance, the residual encoding performed by the encoding stage 24 may be performed also on a block-basis. However, prediction blocks which the prediction provider 16 operates on, may differ from residual blocks in units of which the encoding stage 24 operates. That is, the picture 12 may be subdivided into prediction blocks differently than its subdivision into residual blocks. For example, but not exclusively, the subdivision into residual blocks may represent an extension of the subdivision into prediction blocks so that each residual block is either a fraction of a corresponding prediction block, or coincides with a certain prediction block, but does not overlay to neighboring prediction blocks. Moreover, the prediction provider 16 may use different coding modes in order to perform its prediction, and the switching between these modes may take place in blocks which might be called coding blocks, which may also differ from prediction blocks and/or residual blocks. For example, the subdivision of the picture 12 into coding blocks may be such that each prediction block merely overlays one corresponding coding block, but may be smaller than this corresponding coding block. The coding modes just mentioned may include spatial prediction modes and temporal prediction modes.

In order to explain the functionality or mode of operation of the apparatus 100 further, reference is made to FIG. 2 which illustrates that the picture 12 might be a picture belonging to a video, i.e., may be one picture out of a temporal sequence of pictures 44, but it should be noted that this is merely an illustration and the apparatus 100 may also be applicable to still pictures 12. FIG. 2 specifically indicates one prediction block 46 within the picture 12. This prediction block shall be the block for which the prediction provider 16 is currently to perform a prediction. In order to predict the block 46, the prediction provider 16 uses previously encoded portions of the picture 12 and/or the video 44 or, alternatively speaking, portions which are already reconstructable for the decoder from the data stream 14 when trying to perform the same prediction for the block 46. To this end, the prediction provider 16 uses the reconstructable version, i.e., the version also reconstructable at the decoder side. Different coding modes are available. For instance, the prediction provider 16 may predict the block 46 by way of temporal prediction such as motion-compensated prediction on the basis of a reference picture 48. Alternatively, the prediction provider 16 may predict the block 46 using spatial prediction. For instance, the prediction provider 16 may extrapolate a previously encoded neighborhood of the block 46 into the inner of the block 46 along a certain extrapolation direction. In case of motion-compensated prediction, a motion vector may be signaled for the block 46 within the data stream 14 to the decoder as prediction parameter. Likewise, an extrapolation direction may be signaled within the data stream 14 to the decoder for the block 46 in case of spatial prediction as prediction parameter.

That is, the prediction provider 16 outputs a predicted filling of predetermined block 46. The predicted filling is illustrated in FIG. 1 at 48. It is actually the first version 48 of this predicted filling as it will be "improved" by the subsequent sequence of components 18, 20 and 22 as explained further below. That is, the prediction provider 16 predicts a predicted sample value for each sample 50 within the block 46, this predicted filling representing the first version 48.

As depicted in FIG. 1, the block 46 may be rectangular or even quadratic. However, this is merely an example and should not be treated as limiting.

The spectral decomposer is configured to spectrally decompose a region 52 composed of the first version 48 of predicted filling for the block 46 and an extension thereof, namely a previously encoded version of a neighborhood 54 of the block 46. That is, geometrically, the spectral decomposer 20 performs a spectral decomposition onto a region 52 comprising, in addition to the block 46, a neighborhood 54 of the block 46, with the portion of region 52 corresponding to the block 46, being filled with the first version 48 of a predicted filling of the block 46, and the neighborhood 54 being filled with the sample values being reconstructable from the data stream 14 at the decoding side. The spectral decomposer 18 receives the predicted filling 48 from the prediction provider 16 and receives the reconstructed sample values for neighborhood 54 from the reconstruction stage 34.

FIG. 2 illustrates, for instance, that the picture 12 is coded into the data stream 14 by the apparatus 100 according to a certain coding/decoding order 58. This coding order may, for instance, traverse the picture 12 from an upper left corner to a lower right corner. The traversal may run row-wise as illustrated in FIG. 2, but could alternatively run column-wise or diagonally. However, all these examples are merely illustrative and should also not be treated as being limiting. Owing to this general propagation of the coding/decoding order from top left to bottom right of the picture 12, for most prediction blocks 46, the neighborhood of the block 46 to the top of or being adjacent to the top side $46_1$ and to the left of or being adjacent to the left-hand side $46_4$ of the block 46 has already been encoded into the data stream 14 and is already reconstructable from the data stream 14 at the decoding side when performing encoding/reconstruction of the block 46. Accordingly, in the example of FIG. 2, neighborhood 54 represents a spatial extension of the block 46 beyond sides $46_1$ and $46_4$ of the block 46, thereby describing an L-shaped area which, together with the block 46 results in a rectangular region 52 the lower and right-hand sides of which coincide, or are co-linear to, the left and bottom sides $46_2$ and $46_3$ of the block 46.

That is, the spectral decomposer 18 performs a spectral decomposition onto a sample array corresponding to region 52 wherein the samples corresponding to neighborhood 54 are the sample values reconstructable from the data stream 14 using their prediction residual coded into the data stream 14 by the encoding stage 24, while the samples of region 52 within the block 46 are the sample values of the predicted filling 48 of the prediction provider 16. The spectral decomposition which the spectral decomposer 18 performs onto this region 52, i.e., its transform type, may be a DCT, DST or wavelet transform. Optionally, but not exclusively, the transformation $T_2$ used by the spectral decomposer 18 may be of the same type as the transformation $T_1$ used by transformer 28 for transforming the prediction residual as output by transformer 28 into spectral domain. If they are of the same type, the spectral decomposer 18 and transformer 28 may share certain circuitry and/or computer code responsible for, or designed for, performing transformations of that type. However, the transformations performed by the spectral decomposer 18 and transformer 28 may alternatively by different.

The output of the spectral decomposer 18 is, thus, a first spectrum 60, also referred to as a set 60 of coefficients. The spectrum 60 or set of coefficients may be an array of spectral coefficients. For instance, the number of spectral coefficients may be equal to the number of samples within region 52. The spatial frequency to which the spectral components belong may increase column-wise from left to right as far as spatial frequencies along the horizontal axis x are concerned, and from top to bottom as far as spatial frequencies within region 52 along the y axis are concerned. However, it should be noted that the $T_2$ may alternatively to the above examples be "overcomplete", so that the number of transform coefficients resulting from $T_2$ may even be larger than the number of samples within region 52.

Noise reducer 20 then performs a noise reduction onto the spectrum 60 to obtain a second, or noise-reduced spectrum 62 or set of coefficients. An example as to how the noise reduction by noise reducer 20 may be performed, will be provided in the following. In particular, noise reduction 20 may involve a thresholding of the spectral coefficients. Spectral coefficients lower than a certain threshold value may be either set to zero, or may be shifted towards zero by an amount equal to the threshold. However, all these examples are merely illustrative and many alternatives exist with respect to performing noise reduction on the spectrum 60 to result into the spectrum 62.

The spectral composer 22 then performs the inverse of the spectral decomposition performed by the spectral decomposer 18. That is, the inverse transformation is used by the spectral composer 22 compared to the spectral decomposer 18. As a result of the spectral composition, which may alternatively be called synthesis, the spectral composer 22 outputs the second version of a predicted filling for the block 46 indicated by hatching at 64 in FIG. 1. It is to be understood, that the spectral composition of composer 22 results in a modified version of whole region 52. As indicated, however, by different hatchings for the block 46 on the one hand and neighborhood 54 on the other hand, merely the portion corresponding to the block 46 is of interest and forms the second version of the predicted filling of the block 46. It is indicated by cross-hatching in FIG. 1. The spectral composition of region 52 within neighborhood 54 is illustrated in FIG. 1 using simple hatching and may not even be computed by the spectral composer 22. It is briefly noted here, that the "inversity" may already be fulfilled when the spectral decomposition $T_2^{-1}$ performed by the spectral composer 22 is left inverse of $T_2$, i.e., $T_2^{-1} \cdot T_2 = 1$. That is, two-sided inversity is not necessary. For example, in addition to the above transformation examples, $T_2$ may be a shearlet or contourlet transformation. Whatever transformation type is used for $T_2$, it is advantageous if all basis functions of $T_2$ extend over the whole region 52, or if all basis functions cover at least a large fraction of region 52.

Notably, owing to the fact that the spectrum 62 has been obtained by transforming, noise reducing and retransforming region 52 which also covers an already encoded and, as far as the decoding side in concerned, reconstructable version, the second version 64 of the predicted filling likely results in a lower prediction error and may, thus, represent an improved predictor for finally coding the block 46 into the data stream 14 by the encoding stage 24, i.e., for performing the residual coding.

As already mentioned above, selector 42 may optionally be present in the encoder 100. If not present, the second version 64 of predicted filling of the block 46 inevitably represents the final predictor of the block 46 entering the inverting input of adder/subtractor 26 which, accordingly, computes the prediction residual or the prediction error by subtracting the final predictor from the actual content of the picture 12 within the block 46. The encoding stage 24 then transforms this prediction residual into spectral domain where the quantizer 30 performs quantization onto the respective spectral coefficients which represent this prediction residual. The entropy encoder 32, inter alias, entropy-encodes these quantized coefficient levels into the data stream 14. As already mentioned above, owing to the coding/decoding order 58, the spectral coefficients concerning the prediction residual within the neighborhood 54 are already present within the data stream 14, prior to the prediction of the block 46. The quantizer 36 and the inverse transformer 28 recover the prediction residual of the block 46 in a version also reconstructable at the decoding side and the adder 40 adds this prediction residual to the final predictor, thereby revealing the reconstructed version of already encoded portions which, as already stated above, also include neighborhood 54, i.e., comprise the reconstructed version 56 of neighborhood 54 using which the portion of region 52 is populated which is then subject to spectral decomposition by a spectral decomposer 18.

If, however, optional selector 42 is present, then selector 42 may perform a selection between the first version 48 and the second version 64 of predicted filling for the block 46 and use either one of these two versions as the final predictor entering the inverting input of adder/subtractor 26 and the respective input of the adder 40, respectively.

The manner at which the second or improved version 64 of the predicted filling for the block 46 is derived by blocks 18 to 22 and the optional selection 42 may be parametrizable for the encoder 100. That is, the encoder 100 may parametrize this manner with respect to one or more of the following options, with the parametrization being signaled to the decoder by way of a respective signalization. For instance, the encoder 100 may decide on selecting version 48 or 64 and signal the result of the selection by way of a signalization 70 in the data stream. Again, the granularity at which the selection 70 is performed, may be a sub-picture granularity and may, for instance, be done in areas or blocks into which the picture 12 is subdivided. In particular, the encoder 100 may perform the selection for each prediction block such as the block 46 individually and signal the selection by way of signalization 70 in the data stream 14 for each such prediction block. A simple flag may be signaled for each block such as the block 46 in the data stream 14. Spatial prediction may be used so as to code signalization 70 in the data stream 14. For example, the flag may be spatially predicted on the basis of signalization 70 contained in the data stream 14 for neighboring blocks in neighboring block 46. Additionally or alternatively, context-adaptive entropy coding may be used in order to code signalization 70 into the data stream. The context used to entropy code signalization 70 for a certain block 46 into the data stream 14 may be determined on attributes contained in the data stream 14 for the neighboring block 46, such as the signalization 70 signaled in the data stream 14 for such neighboring blocks.

Additionally or alternatively, a further parametrization option for the encoder 100 might be the size of region 52 or, alternatively speaking, the size of neighborhood 54. For example, the encoder 100 may set a position of the corner of region 52 which is opposite to the corner 74 of the block 46 co-located to the corresponding corner of the block 46. Signalization 72 may indicate the position of this corner 76, or the size of region 52, respectively, by way of an index into a list of available corner positions or sizes, respectively. The corner positions may be indicated relative to the upper left corner of the block 46, i.e., as a vector relative to a corner of the block 46 opposite to the corner shared among region 52 and the block 46. The setting of the size of region 52 may be done by the apparatus 100 also at a sub-picture granularity such as areas or blocks into which the picture 12 is subdivided, wherein these areas or blocks may coincide with the prediction block, i.e., the encoder 100 may perform the setting of the size of region 52 for each block 46 individually.

Signalization 72 may be coded into the data stream 14 using predictive coding as explained with respect to signalization 70, and/or using context-adaptive entropy coding using a spatial context similar to signalization 70.

Figure 3:
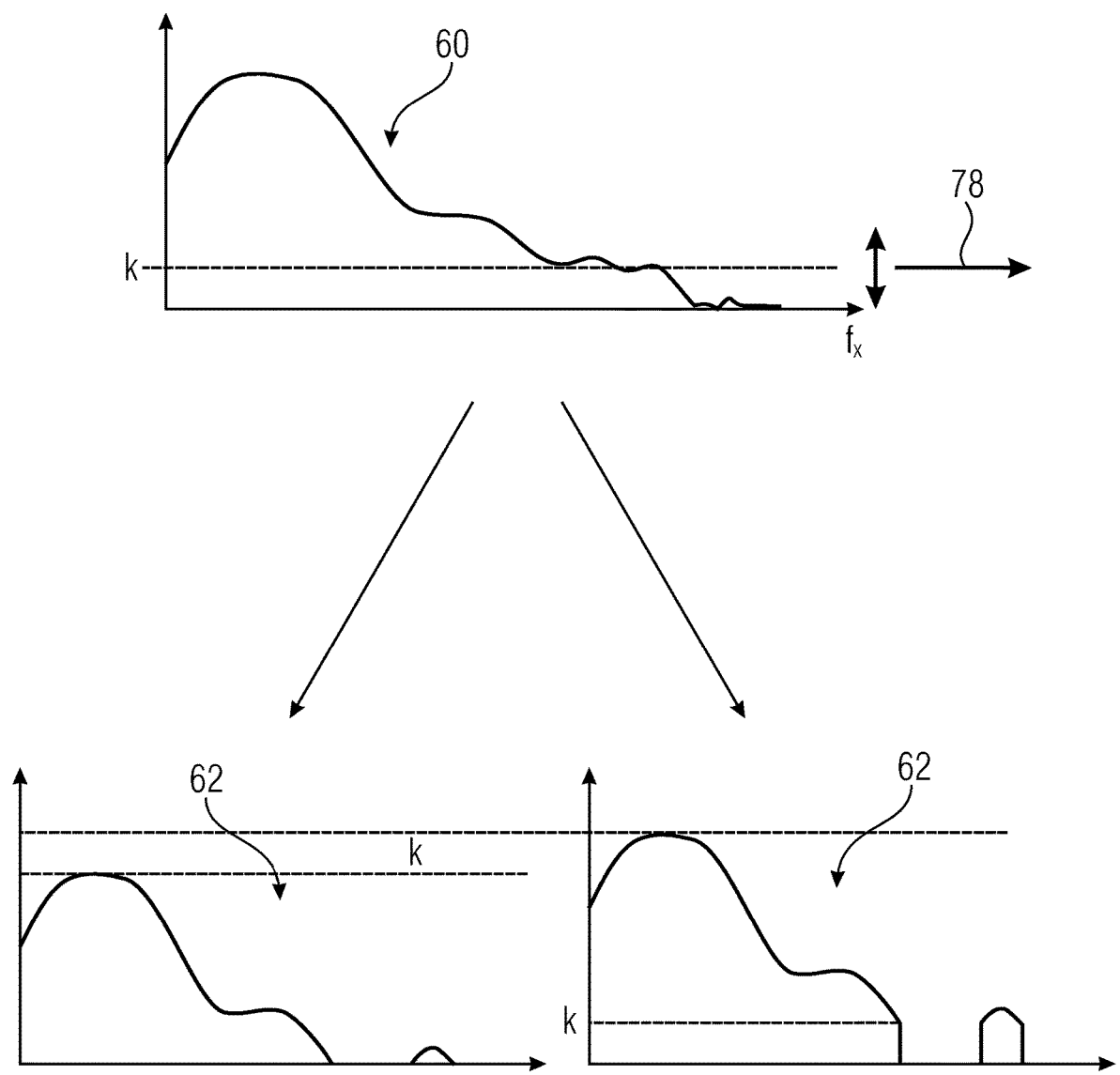
FIG. 3 shows a schematic diagram illustrating two alternatives for a noise reduction using a threshold.
Figure 4:
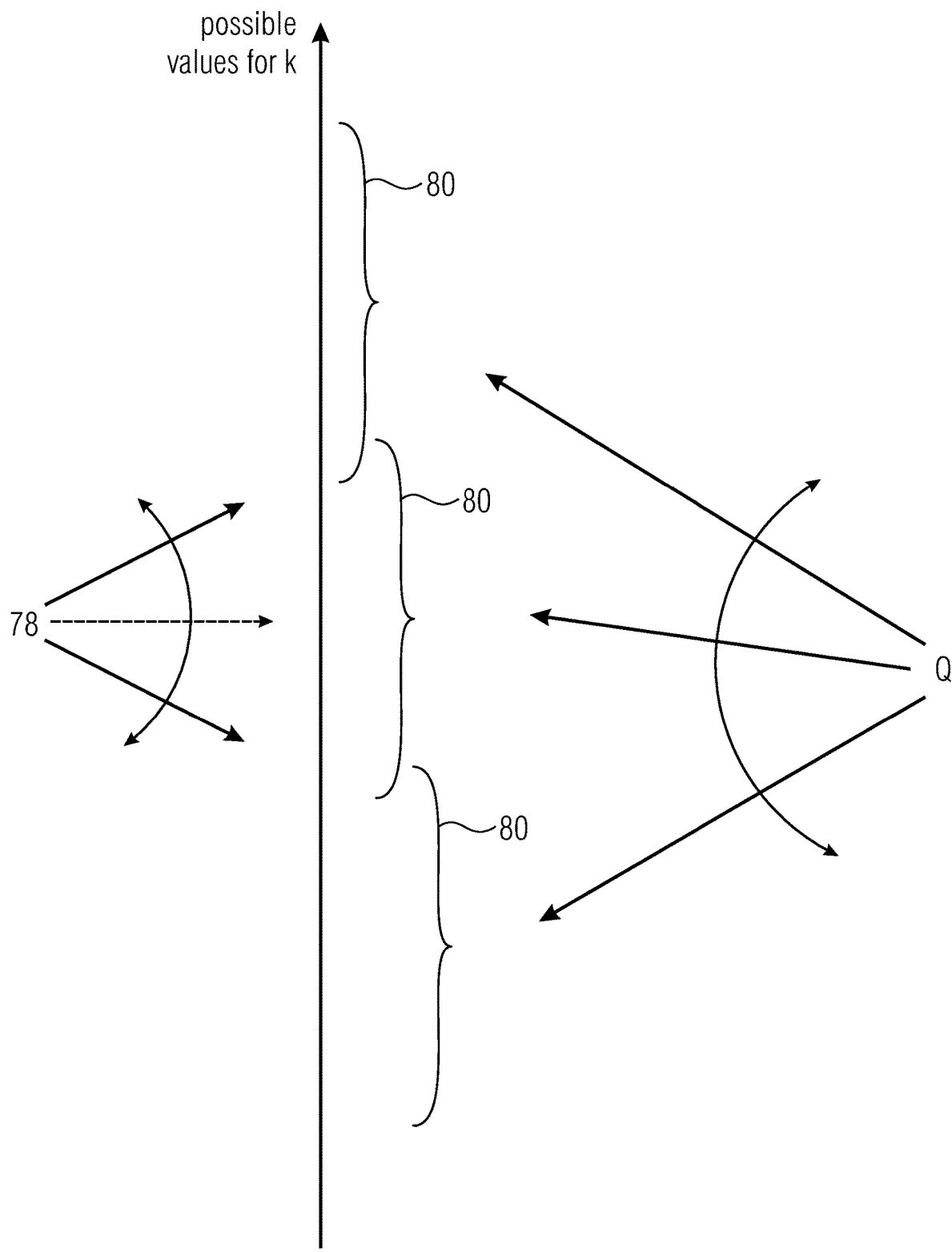
FIG. 4 shows a schematic diagram illustrating a selection among possible noise reduction strengths.

Alternatively or additionally to signalizations 70 and 72, the apparatus 100 may also be configured to determine a strength of the noise reduction performed by noise reducer 20. For instance, by way of a signalization 78 (FIG. 3) the apparatus 100 may signal a determined or chosen strength. For instance, signalization 78 may indicate a threshold κ which is also mentioned in the more mathematically presented implantation example described herein below. FIG. 3 illustrates that noise reducer 20 may use this threshold κ so as to set all spectral components or coefficients of the spectrum 60 or set of coefficients succeeding κ to zero so as to result into the spectrum 62, or clip the spectrum 60 below the threshold κ and collapse, or shifting to zero, the portion of the spectrum 60 exceeding threshold κ so as to start from zero as illustrated in FIG. 3. The same as indicated above with respect to signalizations 70 and 72 holds true for signalization 78. That is, the apparatus 100 may conduct the setting of the noise reduction strength or the threshold κ picture-globally or sub-picture granularly. In the latter case, the encoder 100 may optionally perform the setting for each block 46 individually. In accordance with a specific example illustrated with respect to FIG. 4, the encoder 100 may select the noise reduction strength or threshold κ out of a set of possible values for κ which set is itself selected out of a plurality of sets 80. The selection among sets 80 may be performed based on the quantization parameter Q on the basis of which the quantizer 30 performs the quantization and the dequantizer 36 performs the dequantization of the prediction residual signal. The selection of the actual noise reduction strength or threshold κ to be actually used among the possible values for κ in the selected set 80 is then signaled by signalization 78. It should be understood that quantization parameter Q may be signaled in the data stream 14 at a granularity differing from the granularity at which signalization 78 is signaled in the data stream 14. For instance, quantization parameter Q may be signaled in the data stream 14 on a slice basis or picture basis while signalization 78 may, as just outlined, be signaled in the data stream 14 for each block 46. Similar to the above comments, signalization 78 may be conveyed within the data stream 14 using predictive coding and/or context-adaptive entropy coding using a spatial context.

Figure 5:
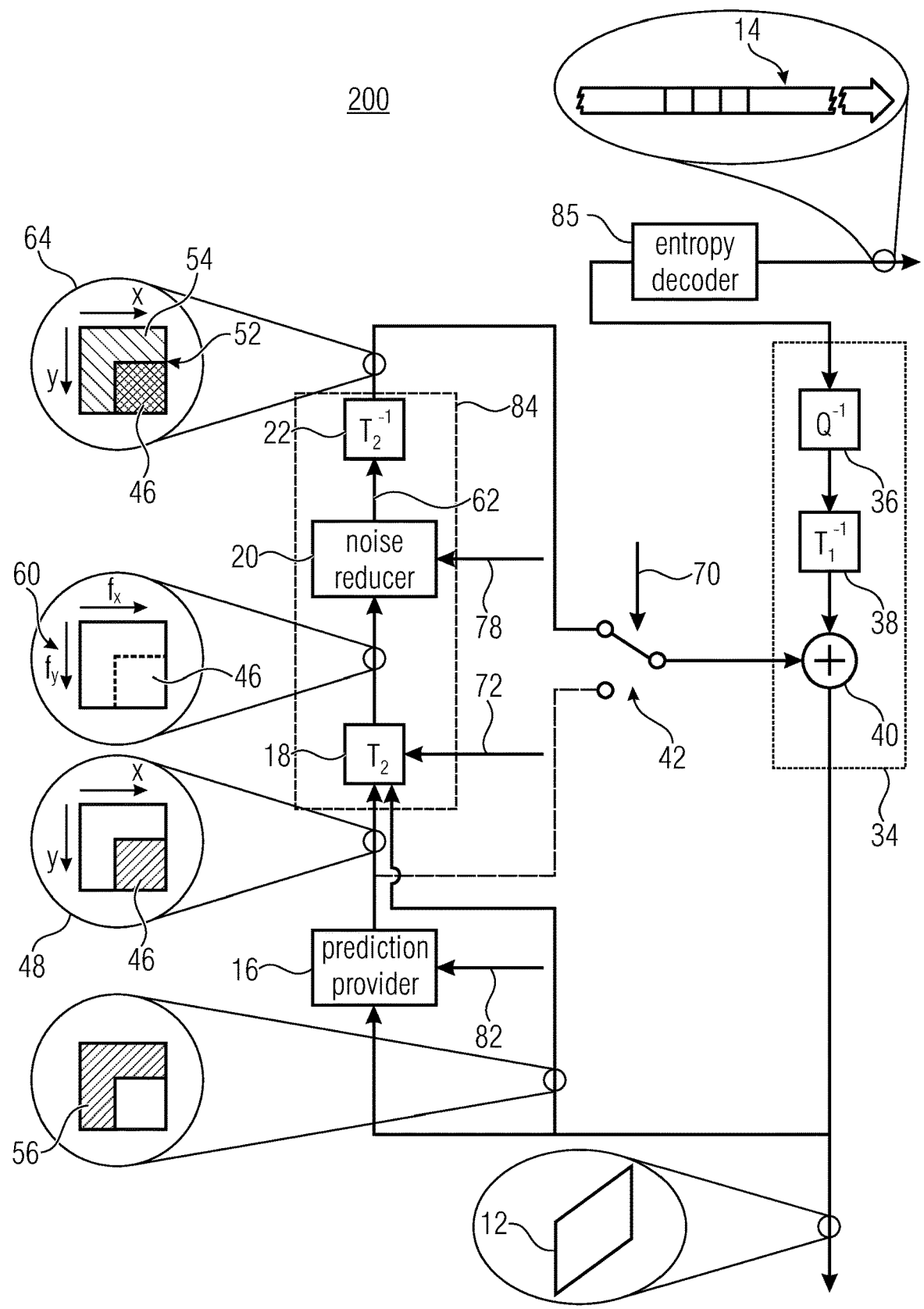
FIG. 5 shows a block diagram of a decoding apparatus fitting to the apparatus of FIG. 1.

FIG. 5 shows an apparatus for block-based predictive decoding the picture 12, a reconstructed version of the picture 12, from the data stream 14 which fits to the apparatus of FIG. 1. Largely, the internal structure of the decoder 200 of FIG. 5 coincides with the internal structure of the encoder 100 as far as their task with respect to those coding parameters is concerned, which are finally selected by the apparatus 200 of FIG. 1. Accordingly, FIG. 5 shows that the apparatus 200 of FIG. 5 comprises a prediction loop into which components 40, 16, 18, 20, 22 and optional selector 42 are serially connected in the manner shown and described above with respect to FIG. 1. The spectral decomposer 18, the noise reducer 20 and the spectral composer 22 may also be referred to as a refinement block 84 of the decoder. As the reconstructed portions of the signal to be reconstructed, i.e., the picture 12, results at the output of the adder 40, this output represents output of the decoder 200. Optionally, picture improving modules, such as post-filters could be positioned in front of the output.

It should be taken into account that whenever the apparatus 100 has the freedom to select a certain coding parameter, the apparatus 100 selects this coding parameter for maximizing, for instance, a certain optimization criterion such as, for instance, a rate/distortion cost measure. Signalization in the data stream 14 is then used to keep predictions performed by the encoder 100 and the decoder 200 synchronized. The corresponding modules or components of the decoder 200 may be controlled by a respective signalization included into the data stream 14 by the encoder 100 and signalizing the chosen coding parameter. For instance, the prediction provider 16 of the decoder 200 is controlled via coding parameters in the data stream 14. These coding parameters indicate the prediction mode, for instance, and the prediction parameters for the indicated prediction mode, for instance. The coding parameters are chosen by the apparatus 100. An example for the coding parameters 82 have been mentioned above. The same circumstance as just outlined with respect to coding parameters 82 and prediction parameters, respectively, is true with respect to each of signalizations 70, 72 and 78, too, all of which are optional, i.e., either none, one, two or all of same may be present. At the encoding side of the apparatus 100, the respective signalization is chosen to optimize some criterion, and the parameter chosen is indicated by way of the respective signalization. The signalization 70, 72 and 78 steers the control of selector 42, which is optional, with respect to the selection among the predicted filling version, the spectral decomposer 18 with respect to the size of region 52, such as via indicating the relative vector to the upper left vertex of region 52, and noise reducer 20 with respect to the strength of noise reduction such as via indicating the threshold to be used. The loop just outlined, into which the adder 40 of reconstructor 34 followed by the prediction provider 16, the spectral decomposer 18, noise reducer 20 and the spectral composer 22 and, optionally, selector 42 are serially connected, is continuously fed with new residual data via the other input of the adder 40, i.e., the input not connected to selector 42. In particular, an entropy decoder 85 performs the inverse of entropy encoder 32, namely same entropy decodes the residual signal in spectral domain, namely the coefficient levels, from the data stream 14 in a manner so that same pertain to the blocks 46 serially along the above-mentioned coding/decoding order 58. The entropy decoder 85 forwards these coefficient levels to reconstruction stage 34 which dequantizes the coefficient levels in the dequantizer 36 and transforms same to spatial domain by the inverse transformer 38 whereupon the thus obtained residual signal is added to the final prediction signal which is the second version 64 or the first version 48 of predicted filling.

Summarizing the above, the decoder 200 has access to the same information basis for performing the prediction by the prediction provider 16 and has already reconstructed the samples within the neighborhood 54 of the currently predicted block 46 using the prediction signal gained from the data stream 14 via the sequence of blocks 32, 36 and 38. If present, signalizations 70, 78 and 72 allow a synchrony between the encoder and the decoder 200. As outlined above, the decoder 200 may be configured to vary the corresponding parameter, namely the selection by selector 42, the size of region 52 at the spectral decomposer 18 and/or the noise reduction strength in noise reducer 20, at sub-picture granularity which granularity may, as already set out above, be different among these parameters. The decoder 200 varies these parameters at this granularity since the signalization 70, 72 and/or 78 is signaled in the data stream 14 at that granularity. As outlined above, spatial decoding may be used by the apparatus 200 to decode any of signalization 70, 72 and 78 from the data stream 14. Additionally or alternatively, context-adaptive entropy decoding using a spatial context may be used. Further, with respect to signalization 78, i.e., the signalization controlling the noise reduction 20, the apparatus 200 may be configured to, as outlined above with respect to FIG. 4, select one of several subsets of possible noise reduction strengths on the basis of a quantization parameter Q which the apparatus 200 determines from the data stream 14 for an area which a currently predicted block 46 is located in, and then determines the noise reduction strength to be actually used for noise reduction for the block 46 on the basis of signalization 78 which selects one out of the pre-selected set of possible noise reduction strengths. For example, each set 80 may comprise eight possible noise reduction strengths. As there are more than one set 80 select, the overall number of possible noise reduction strengths covered by all sets 80 may be eight times the number of sets 80. However, sets 80 may overlap, i.e., some possible noise reduction strengths may be member of more than one set 80. Naturally, eight has been used here merely as an example and the number of possible noise reduction strengths per set 80 may be different than eight and my even vary among sets 80.

Many variations are possible with respect to the above-outlined examples. For instance, the encoding stage 24 and reconstruction stage 34 do not need to be transform-based. That is, the prediction residual may be coded in the data stream 14 in a manner other than using the spectral domain. Further, possibly, the concept may work lossless. As described before with respect to the relationship between decomposer 18 and transformer 38, the inverse transformation by the inverse transformer 38 may be the same, in type, as the transformation performed by composer 22.

The above concept may be implemented in a manner so as to result in a non-linear transform domain based prediction relying on an initial predictor and surrounding reconstructed samples. The concept outlined above may be used to generate a prediction signal in video coding. The principle underlying this concept may in other words be described as follows. In a first step, a picture or video decoder generates a starting prediction signal as in some underlying picture or video compression standard, e.g., by motion compensation or intra or spatial picture prediction. In the second step, the decoder proceeds in the following steps. First, it defines an extended signal which consists of a combination of the prediction signal and the already reconstructed signal. Then, the decoder applies a linear analysis transform to the extended prediction signal. Next, the decoder applies a, for example, non-linear thresholding to the transformed extended prediction signal. In the final step, the decoder applies a linear synthesis transform to the result of the previous step and replaces the starting prediction signal by the result of the synthesis transform, restricted to the domain of the prediction signal.

The block-based predictive coding/decoding of pictures, as described, e.g., in PCT/EP2017/083789, exploits a previously encoded or reconstructed version of a neighborhood of a predetermined block to be predicted so as to result into a more efficient predictive coding of the prediction block. In particular, a spectral decomposition of a region composed of this neighborhood and a first version of a predicted filling of the predetermined block results in a first spectrum or first set of coefficients which is subject to noise reduction, and the thus resulting second spectrum or second set of coefficients may be subjected to a spectral composition, thereby resulting in a modified version of this region including a second version of the prediction signal, like a predicted filling, of the predetermined block. Owing to the exploitation of the already processed, i.e., encoded/reconstructed, neighborhood of the predetermined block, the second version of the predicted filling of the predetermined block tends to improve the coding efficiency.

A first signalization may be used in the data stream so as to select between using the first version of the predicted filling and the second version of the predicted filling. Despite the additional data amount needed for this first signalization, the capability to select between the first version and the second version of the predicted filling may improve the coding efficiency. The first signalization may be conveyed within the data stream at sub-picture granularity so that the selection between the first and second versions may take place at the sub-picture granularity. Additionally or alternatively, a second signalization may be provided in the data stream to set a size of the neighborhood used to extend the predetermined block and form the region with respect to which the spectral decomposition, noise reduction and spectral composition is performed. The second signalization may also be conveyed within the data stream in a manner varying at sub-picture granularity. Yet further, additionally or alternatively, a further signalization may be provided within the data stream to signal an amount or a strength of the noise reduction such as, for example, by indicating a threshold to be applied onto the first spectrum resulting from the spectral decomposition. The third signalization may also be conveyed within the data stream in a manner varying at sub-picture granularity.

The above mentioned first, second and/or third signalizations may be coded in the data stream using spatial prediction and/or using entropy coding using a spatial context, i.e., using a probability distribution estimate for the possible signalization values which depends on a spatial neighborhood of the region for which the respective signalization is contained in the data stream.

Hybrid image and video coders, like those used in High Efficiency Video Coding (HEVC), combine predictive and transform coding together with block-based partitioning. The predictive coding part is limited, in particular the set of available predictors, since each selection at the encoder side is transmitted in the bitstream as side information. This may result in an increased rate. A refinement may improve the prediction signal or the residual signal by exploiting additional information from an already reconstructed part of the signal.

In the following, the signal to be improved or modified, like the prediction signal or the residual signal, may be referred to as the employed signal, the reconstructed part of the signal, like the reconstructed samples or the reconstructed residuals, may be referred to as the reference signal, and a combination of the employed signal and the reference signal may be referred to as the combined signal.

Embodiments of the presented invention describe aspects of the refinement process or refinement step that improves compression efficiency. The inventive approach exploits the correlation or similarity between the employed signal and the reference signal, and since signal parts of the reference signal may be irrelevant, the refinement process may leave them out to modify the employed signal. In a hybrid video and image coding application, a partitioning is performed that results in a structure called a "block". The block may have a square shape or a rectangular shape. Each block typically employs a predictor which generates a residual signal. The residual signal serves as the input for the transform coding stage of the coding architecture. A perfect prediction results in an insignificant residual signal, and such a case may occur in situations where the original samples are completely flat. However, in common situations, the residual signal is significant and undergoes the transform and quantization processes. The final result, the transformed and quantized residuals, is referred to as transform coefficient levels. The inventive approach aims at a refinement of the prediction signal or the residual signal so that the final quantized levels result in a lower rate-distortion cost than without refinement.

Embodiments of the present invention concern the refinement of block-based predictive coding and decoding of pictures, for example the refinement of the block-based predictive coding/decoding approach described above with reference to FIG. 1 to FIG. 5. It has been found that a refinement of either spatially or temporally predicted signals may result in improved compression efficiency. Embodiments may combine/compare the prediction signal and additional reconstructed samples, e.g., in a way as described above, and apply a refinement process in the spatial or in the frequency domain. Other embodiments may extend or modify the above described of block-based predictive coding and decoding of the picture such that, in addition to the prediction signal or as an alternative to the prediction signal, a current residual signal is used as the employed signal and neighboring reconstructed residuals are used as the reference signal. Such embodiments may combine/compare the residual signal and additional reconstructed residuals and apply a refinement process in the spatial and/or in the frequency domain. For example, a resulting combined signal may be transformed to the frequency domain using an appropriate transform, and then the frequency or coefficient positions having negligibly small energy are canceled. After the refinement, the combined signal is transformed back into the spatial domain. The modified and improved prediction or residual signal may then be extracted from the modified version of the combined signal and used for transform coding purposes. In case the signal is already in the frequency domain, like the residual signal, no transform may be needed. In other words, the employed signal, either in the prediction domain or in the residual domain, may be combined with a reference signal. The combined signal undergoes a refinement process so that a correlation or similarity between the employed and the reference signals may be exploited. Finally, the modified employed signal is extracted and undergoes the regular process within the coding chain.

The refinement process may improve the prediction signal or reduce the residual signal by considering their similarity to the additional reconstructed samples or reconstructed residuals. The additional reconstructed samples or reconstructed residuals that have not been fully used for prediction may be combined or compared with the current prediction or the current residual signal. Reconstructed samples or reconstructed residuals not fully used for prediction may refer to samples or residuals from a neighborhood of the currently predicted samples, e.g., from an extension of the currently predicted block in the picture into directly adjacent or offset areas of the picture already processed by the encoder.

Embodiments of the inventive approach relate to various aspects for a prediction refinement using additional reconstructed samples.

(1) A first aspect of the inventive approach provides a block-based predictive encoder/decoder applying a refinement process to the residual signal.

(2) A second aspect of the inventive approach provides a block-based predictive encoder/decoder using prediction signal refinement or residual signal refinement without a combination of the employed signal and the reference signal.

(3) A third aspect of the inventive approach provides a block-based predictive encoder/decoder using selectively or in combination a prediction signal refinement, e.g., for intra coding, and a residual signal refinement, e.g., for inter coding.

(4) A fourth aspect of the inventive approach relates to the selection of the thresholds used for reducing coefficients in the refinement process.

(5) A fifth aspect of the inventive approach relates to the selecting of the neighborhood of the currently predicted block from which the reconstructed samples or reconstructed residuals are obtained for the refinement process.

(6) A sixth aspect of the inventive approach relates to the composing of the modified signal only by applying a partial re-transform.

(7) A seventh aspect of the inventive approach relates to the composing of the modified signal disregarding coefficients below a threshold, but not set to zero or to another reduced value.

(8) An eighth aspect of the inventive approach relates to the signaling of the refinement information.

Decoder/Encoder

Figure 6:
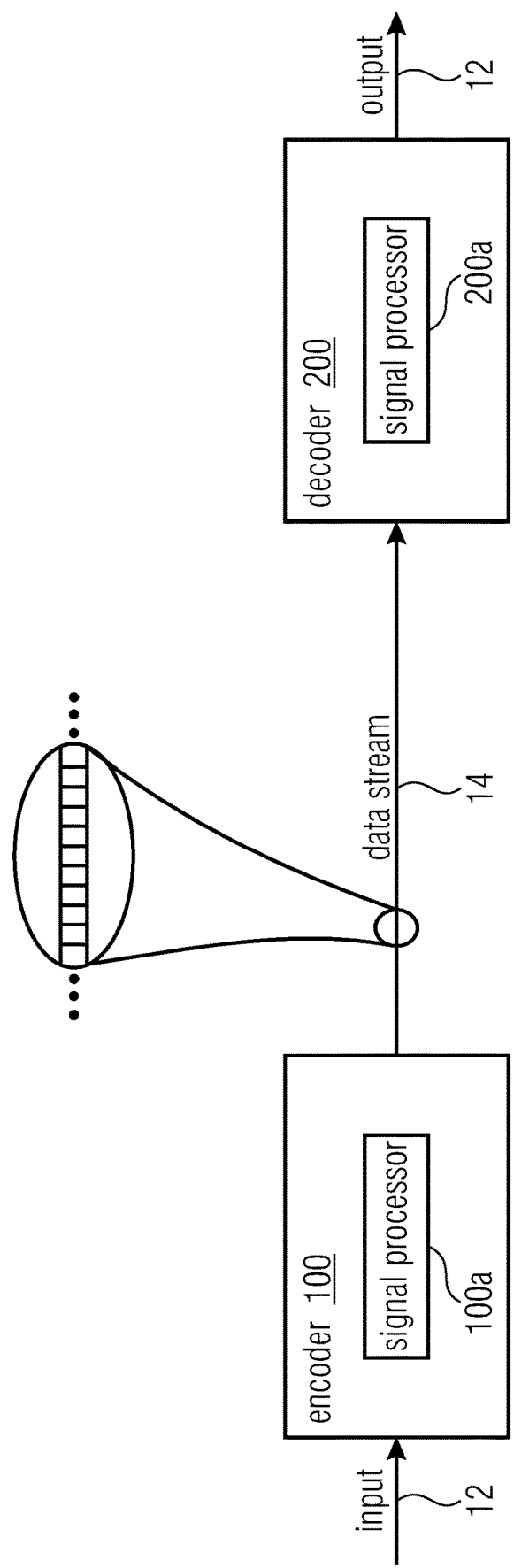
FIG. 6 is a schematic representation of a system for transferring picture or video data from a transmitter to a receiver in accordance with embodiments of the present invention.

Embodiments of the present invention may be implemented in a system including one or more encoders, and one or more decoders, which may be implemented, e.g., in mobile or stationary terminals. FIG. 6 is a schematic representation of a system for communicating video or picture information between an encoder 100 and a decoder 200. The encoder 100 and the decoder 200 may communicate via a wired or wireless communication link for transmitting a data stream 14 including the video or picture information. The encoder 100 includes a signal processor 100a and may operate in accordance with the inventive teachings described herein. The decoder 200 includes a signal processor 200a and may operate in accordance with the inventive teachings described herein.

(1) In accordance with the first aspect of the inventive approach, a decoder 200 is provided. The decoder 200 receives as an input the data stream 14, e.g., an encoded data stream from the encoder 100. The decoder 200, e.g., using its signal processor 200a, implements an apparatus for block-based predictive decoding of a picture, comprising a combiner configured to combine a residual signal for a predetermined block of the picture and a reference signal for the predetermined block so as to obtain a first spectrum or first set of coefficients, the residual signal correcting a prediction error of a prediction of the predetermined block of the picture; a reducer configured to perform thresholding on the first set of coefficients to obtain a second spectrum or second set of coefficients so that coefficients below a threshold value are set to a predefined value; an extractor configured to obtain from the second set of coefficients a modified version of the residual signal; and a reconstructor block configured to decode the predetermined block of the picture from the data stream on the basis of the modified version of the residual signal.

In accordance with the first aspect of the inventive approach, an encoder 100 is provided. The encoder 100 receives as an input an original picture 12, and, e.g., using its signal processor 100a, implements an apparatus for block-based predictive encoding of a picture, comprising an encoding block configured to encode a residual signal into a data stream, the residual signal correcting a prediction error of a prediction of a predetermined block of the picture; a combiner configured to combine the residual signal and a reference signal for the predetermined block so as to obtain a first spectrum or first set of coefficients; a reducer configured to perform thresholding on the first set of coefficients to obtain a second spectrum or second set of coefficients so that coefficients below a threshold value are set to a predefined value; and an extractor configured to obtain from the second set of coefficients a modified version of the residual signal; the encoding block configured to encode the predetermined block into the data stream on the basis of the modified version of the residual signal.

In accordance with embodiments the reference signal comprises previous residual signals of a neighborhood of the predetermined block.

In accordance with embodiments the predetermined block of the picture is an inter-predicted block.

(2) In accordance with the second aspect of the inventive approach, a decoder 200 is provided. The decoder 200 receives as an input the data stream 14, e.g., an encoded data stream from the encoder 100. The decoder 200, e.g., using its signal processor 200a, implements an apparatus for block-based predictive decoding of a picture, comprising a decoding block configured to decode a residual signal from a data stream, the residual signal correcting a prediction error of a prediction signal for a predetermined block of the picture; and a 30 comparator configured to compare, for each frequency position, also referred to as a coefficient position, within a reference signal for the predetermined block, a coefficient against a threshold value, and if the coefficient value is below the threshold, set, at the corresponding coefficient position within an employed signal, the coefficient to the predefined value, thereby obtaining a modified employed signal, wherein the employed signal comprises the prediction signal and/or the residual signal; the decoding block configured to decode the predetermined block from the data stream on the basis of the modified employed signal.

In accordance with the second aspect of the inventive approach, an encoder 100 is provided. The encoder 100 receives as an input an original picture 12, and, e.g., using its signal processor 100a, implements an apparatus for block-based predictive encoding of a picture, comprising an encoding block configured to encode a residual signal into a data stream, the residual signal correcting a prediction error of a prediction signal for a predetermined block of the picture; and a comparator configured to compare, for each coefficient position within a reference signal for the predetermined block, a coefficient against a threshold value, and if the coefficient value is below the threshold, set, at the corresponding coefficient position within an employed signal, the coefficient to the predefined value, thereby obtaining a modified employed signal, wherein the employed signal comprises the prediction signal and/or the residual signal; the encoding block configured to encode the predetermined block into the data stream on the basis of the modified employed signal.

In accordance with embodiments the apparatus comprises a combiner configured to combine the employed signal and the reference so as to obtain a first spectrum or first set of coefficients, wherein the comparator is configured to set, at the corresponding coefficient position within the first set of coefficients, the coefficient to the predefined value, thereby obtaining a modified first set of coefficients, and an extractor configured to obtain from the modified first set of coefficients the modified employed signal.

In accordance with embodiments the apparatus comprises a decomposer configured to perform a transform on a region composed of the prediction signal and the reference signal so as to obtain a first spectrum or first set of coefficients of the region; and a composer configured to subject the modified first set of coefficients to a re-transform so as to obtain a modified version of the region including the modified prediction signal.

(3) In accordance with the third aspect of the inventive approach, a decoder 200 is provided. The decoder 200 receives as an input the data stream 14, e.g., an encoded data stream from the encoder 100. The decoder 200, e.g., using its signal processor 200a, implements an apparatus for block-based predictive decoding of a picture, comprising a reconstructor block configured to decode a predetermined block of a picture from a data stream on the basis of a residual signal, the residual signal correcting a pre-diction error of a prediction of a predetermined block of the picture; a prediction provider configured to provide the prediction of the predetermined block of the picture; a first refinement block for a refinement of the prediction of the predetermined block of the picture; and a second refinement block for a refinement of the residual signal.

In accordance with the third aspect of the inventive approach, an encoder 100 is provided. The encoder 100 receives as an input an original picture 12, and, e.g., using its signal processor 100a, implements an apparatus for block-based predictive encoding of a picture, comprising an encoding block configured to encode a residual signal into a data stream, the residual signal correcting a prediction error of a prediction of a predetermined block of the picture; a prediction provider configured to provide the prediction of the predetermined block of the picture; a first refinement block for a refinement of the prediction of the predetermined block of the picture; and a second refinement block for a refinement of the residual signal.

In accordance with embodiments
the first refinement block is used when processing an intra-predicted block, and the second refinement block is used when processing an inter-predicted block, or the first refinement block is used when processing an inter-predicted block, and the second refinement block is used when processing an intra-predicted block, or the first refinement block is used when processing an intra-predicted block, and the second refinement block is used when processing an intra-predicted block, or the first refinement block is used when processing an inter-predicted block, and the second refinement block is used when processing an inter-predicted block.

In accordance with embodiments the first refinement block receives from the prediction provider a first version of a prediction signal for the predetermined block, and the first refinement block includes a decomposer configured to perform a transform of a region composed of the first version of the prediction signal and a reference signal for the predetermined block so as to obtain a first spectrum or first set of coefficients of the region; a reducer configured to perform thresholding on the first set of coefficients to obtain a second spectrum or second set of coefficients so that coefficients below a threshold value are set to a pre-defined value, the threshold value based on the coefficients for the first version of the prediction signal or on the coefficients for the reference signal; and a composer configured to subject the second set of coefficients to a re-transform so as to obtain a modified version of the region including a second version of the prediction signal, and to provide to the reconstructor block the second version of the prediction signal.

In accordance with embodiments the second refinement block receives from the reconstructor block the residual signal, and the second refinement block includes a combiner configured to combine the residual signal and a reference signal for the predetermined block so as to obtain a first spectrum or first set of coefficients; a reducer configured to perform thresholding on the first set of coefficients to obtain a second spectrum or second set of coefficients so that coefficients below a threshold value are set to a pre-defined value; and an extractor configured to obtain from the second set of coefficients a modified version of the residual signal and to provide to the reconstructor block the modified version of the residual signal.

In accordance with embodiments the threshold value is based on the coefficients for the first version of the prediction signal or on the coefficients for the reference signal or on the coefficients for the combined signal.

(4) In accordance with the fourth aspect of the inventive approach, a decoder 200 is provided. The decoder 200 receives as an input the data stream 14, e.g., an encoded data stream from the encoder 100. The decoder 200, e.g., using its signal processor 200a, implements an apparatus for block-based predictive decoding of a picture, comprising a prediction provider configured to predict a predetermined block of the picture to obtain a first version of a prediction signal for the predetermined block; a decomposer configured to perform a transform a region composed of the first version of the prediction signal and a reference signal for the predetermined block so as to obtain a first spectrum or first set of coefficients of the region; a reducer configured to perform thresholding on the first set of coefficients to obtain a second spectrum or second set of coefficients so that coefficients below a threshold value are set to a predefined value, the threshold value based on the coefficients for the first version of the prediction signal or on the coefficients for the reference signal or on the coefficients for a combined signal including the prediction signal and the reference signal; a composer configured to subject the second set of coefficients to a re-transform so as to obtain a modified version of the region including a second version of the prediction signal; and a reconstructor block configured to decode the predetermined block of the picture from the data stream on the basis of the second version of the prediction signal.

In accordance with the fourth aspect of the inventive approach, an encoder 100 is provided. The encoder 100 receives as an input an original picture 12, and, e.g., using its signal processor 100a, implements an apparatus for block-based predictive encoding of a picture, comprising a prediction provider configured to predict a predetermined block of the picture to obtain a first version of a prediction signal for the predetermined block; a decomposer configured to perform a transform of a region composed of the first version of the prediction signal and a reference signal for the predetermined block so as to obtain a first spectrum or first set of coefficients of the region; a reducer configured to perform thresholding on the first set of coefficients to obtain a second spectrum or second set of coefficients so that coefficients below a threshold value are set to a predefined value, the threshold value based on the coefficients for the first version of the prediction signal or on the coefficients for the reference signal or on the coefficients for a combined signal including the prediction signal and the reference signal; a composer configured to subject the second set of coefficients to a re-transform so as to obtain a modified version of the region including a second version of the prediction signal; and an encoding block configured to encode the predetermined block into a data stream on the basis of the second version of the prediction signal.

Further, the fourth aspect of the inventive approach provides for each of the decoders or apparatuses described herein, e.g., an apparatus of any one of the preceding aspects 1 to 3 or any one of the following aspects 5 to 8, embodiments regarding the selection of the thresholds used for reducing coefficients in the refinement process.

In accordance with embodiments the threshold value is based on the coefficients for the first version of the prediction signal or on the coefficients for the reference signal or on the coefficients for the combined signal.

In accordance with embodiments setting the coefficients by the thresholding to the predefined value includes:
setting a coefficient to a certain value that depends on the threshold value, e.g., a preset fraction of the threshold value, like half the threshold, or a preset absolute value, like zero, and/or
reducing a coefficient by a certain amount, e.g., by moving a value of the coefficient towards a preset value, like zero, e.g., by an amount equal to the threshold value or to a fraction of the threshold, like half the threshold.

In accordance with embodiments setting a coefficient to the predefined value comprises quantizing the coefficient associated with the predefined value.

In accordance with embodiments the coefficients for the first version of the prediction signal/the coefficients for the residual signal or the coefficients for the reference signal define a candidate list for the threshold value, the candidate list being also derivable at a decoder side.

In accordance with embodiments duplicates and entries that are already zero are removed from the candidate list.

In accordance with embodiments a threshold value from the candidate list that is used for thresholding is denoted by an index, the index transmitted in the bitstream.

In accordance with embodiments the indices of the candidate list are binarized, e.g., using a Truncated Unary code, and a single context model or a dedicated context model may be used for each bin position.

In accordance with embodiments, for reducing signaling over-head, the candidate list is quantized, the quantization step size being signaled in the bitstream or in the header syntax, wherein the quantization step size depends, e.g., on a picture quantization parameter.

In accordance with embodiments the candidate list length is limited so that only certain threshold values are kept in the candidate list.

In accordance with embodiments the candidate list length is limited, either externally or internally, depending on the prediction mode and/or the quantization parameter, or threshold values starting with a maximum threshold value in the candidate list are removed from the candidate list until a desired number of threshold values is achieved, or a decision which threshold values to keep is made either by a fixed scheme or de-pending on the characteristics/distribution of the coefficients of the combined signal and the reference signal.

In accordance with embodiments the threshold value is based on the coefficients for the first version of the prediction signal/the coefficients for the residual signal, and wherein each transform coefficient forms a limit that defines a threshold value.

In accordance with embodiments the reducer is configured to compare, for each coefficient position within the reference signal, a coefficient against the threshold value, and, if the coefficient value is below the threshold, setting, at the corresponding coefficient position within the first version of the prediction signal/the residual signal, the coefficient to the predefined value, or compare, for each coefficient position within the transformed first version of the pre-diction signal/the residual signal, a coefficient against the threshold value, and, if the coefficient value is below the threshold, setting, at the corresponding coefficient position within the reference signal, the coefficient to the predefined value.

(5) The fifth aspect of the inventive approach provides for each of the decoders or apparatuses described herein, e.g., an apparatus of any one of the preceding aspects 1 to 4 or any one of the following aspects 6 to 8, embodiments regarding the selection of the neighborhood of the currently predicted block from which the reconstructed samples or reconstructed residuals are obtained for the refinement process.

In accordance with embodiments the neighborhood of the predetermined block is selected dependent on the size of the predetermined block such that the final block has a certain size, e.g., the certain size being an integer multiple, like, twice, of the size of the predetermined block.

In accordance with embodiments the neighborhood of the predetermined block comprises a spatial area surrounding one of more sides of the predetermined block, and/or a spatial area offset relative to the predetermined block, and/or a spatial area surrounding one of more sides of a reference block.

In accordance with embodiments the spatial area surrounding one of more sides of the predetermined block comprises an extension of the predetermined block to the left so that the total width is N and to the top so that the total height is M, both N and M being advantageously equal.

In accordance with embodiments the offset is signaled as an in-picture motion vector so that the reference signal includes samples that are available at a decoder, and wherein the in-picture motion vector may be selected, dependent on a selected quantization parameter, from a candidate list of predefined motion vectors.

In accordance with embodiments the spatial area offset relative to the predetermined block area has the same size as the predetermined block, and the offset is signaled by an in-picture motion vector or by a pointer to another block that has been processed earlier In accordance with embodiments the neighborhood of the predetermined block is configured dependent on one or more of a prediction mode, like intra prediction or inter prediction, and a quantization parameter.

In accordance with embodiments different sizes for the neighborhood are listed in a candidate list, and a selected size is denoted by an index, the index transmitted in the bitstream, wherein each index transmitted in the bitstream may denote an increase in size so that the next available extension size is selected at a decoder.

In accordance with embodiments the next available size matches the available transforms and extends the block to the next available transform size in both directions so that an increment of the transmitted index results in an increase for both sizes to the next available transform.

In accordance with embodiments the indices of the candidate list are binarized, e.g., using a Truncated Unary code, and a single context model or a dedicated context model may be used for each bin position.

In accordance with embodiments the number of indices is limited, either externally configured or internally, due to limitations on the available number of samples when operating close to the edge of the frame or coupled to the quantization parameter.

(6) In accordance with the sixth aspect of the inventive approach, a decoder 200 is provided. The decoder 200 receives as an input the data stream 14, e.g., an encoded data stream from the encoder 100. The decoder 200, e.g., using its signal processor 200*a*, implements an apparatus for block-based predictive decoding of a picture, comprising a prediction provider configured to predict a predetermined block of the picture to obtain a first version of a prediction signal for the predetermined block; a decomposer configured to perform a transform a region composed of the first version of the prediction signal and a reference signal for the predetermined block so as to obtain a first spectrum or first set of coefficients of the region; a reducer configured to perform thresholding on the first set of coefficients to obtain a second spectrum or second set of coefficients so that coefficients below a threshold value are set to a predefined value; a composer configured to subject the second set of coefficients to a re-transform so as to directly obtain a second version of the prediction signal; and a reconstructor block configured to decode the predetermined block of the picture from the data stream on the basis of the second version of the prediction signal.

In accordance with the sixth aspect of the inventive approach, an encoder 100 is provided. The encoder 100 receives as an input an original picture 12, and, e.g., using its signal processor 100*a*, implements an apparatus for block-based predictive encoding of a picture, comprising a prediction provider configured to predict a predetermined block of the picture to obtain a first version of a prediction signal for the predetermined block; a decomposer configured to perform a transform of a region composed of the first version of the prediction signal and a reference signal for the predetermined block so as to obtain a first spectrum or first set of coefficients of the region; a reducer configured to perform thresholding on the first set of coefficients to obtain a second spectrum or second set of coefficients so that coefficients below a threshold value are set to a predefined value; a composer configured to subject the second set of coefficients to a re-transform so as to directly obtain a second version of the prediction signal; and an encoding block configured to encode the predetermined block into a data stream on the basis of the second version of the prediction signal.

In accordance with embodiments the second version of the prediction signal is directly obtained without a full reconstruction of the region in the spatial domain.

In accordance with embodiments the second version of the prediction signal is directly obtained by a partial reconstruction of the region in the spatial domain.

(7) In accordance with the seventh aspect of the inventive approach, a decoder 200 is provided. The decoder 200 receives as an input the data stream 14, e.g., an encoded data stream from the encoder 100. The decoder 200, e.g., using its signal processor 200*a*, implements an apparatus for block-based predictive decoding of a picture, comprising a prediction provider configured to predict a predetermined block of the picture to obtain a first version of a prediction signal for the predetermined block; a decomposer configured to perform a transform a region composed of the first version of the prediction signal and a reference signal for the predetermined block so as to obtain a first spectrum or first set of coefficients of the region; a reducer configured to perform thresholding on the first set of coefficients to determine coefficients below a threshold value; a composer configured to subject the first set of coefficients to a re-transform so as to obtain a modified version of the region including a second version of the prediction signal, wherein coefficient positions having amplitudes below the threshold value are not considered in the composition; and a reconstructor block configured to decode the predetermined block of the picture from the data stream on the basis of the second version of the prediction signal.

In accordance with the seventh aspect of the inventive approach, an encoder 100 is provided. The encoder 100 receives as an input an original picture 12, and, e.g., using its signal processor 100*a*, implements an apparatus for block-based predictive encoding of a picture, comprising a prediction provider configured to predict a predetermined block of the picture to obtain a first version of a prediction signal for the predetermined block; a decomposer configured to perform a transform a region composed of the first version of the prediction signal and a reference signal for the predetermined block so as to obtain a first spectrum or first set of coefficients of the region; a reducer configured to perform thresholding on the first set of coefficients to determine coefficients below a threshold value; a composer configured to subject the first set of coefficients to a re-transform so as to obtain a modified version of the region including a second version of the prediction signal, wherein coefficient positions having amplitudes below the threshold value are not considered in the composition; and an encoding block configured to encode the predetermined block into a data stream on the basis of the second version of the prediction signal.

In accordance with embodiments the reference signal comprises a previously decoded version of a neighborhood of the predetermined block.

(8) The eighth of the inventive approach provides for each of the decoders or apparatuses described herein, e.g., an apparatus of any one of the preceding aspects 1 to 7, embodiments relating to the signaling of the refinement information.

In accordance with embodiments the apparatus is configured to transmit side information describing a configuration of the encoding process, e.g., a location of the reference signal, a threshold value, an index indicating a threshold value and the like, for each partitioning structure separately or for several partitioning structures.

In accordance with embodiments, when transmitting the configuration of the encoding process for several partitioning structures, the apparatus is configured to apply an iterative strategy including selecting parameters for the encoding process based of a fixed grid containing several partitioning structures, and recalculating the grid using the results of the encoding process using the selected parameters.

It is noted that, in accordance with further embodiments, respective methods for implementing the $1^{st}$ through $8^{th}$ aspect are provided, and the inventive teachings described hereinbelow in the context of an apparatus also represent a description of the corresponding method, where a block or a device corresponds to a method step or a feature of a method step.

Data Stream

The present invention provides a data stream having a picture encoded thereinto, the data stream being generated by one or more methods of in accordance with the present invention.

Computer Program Product

The present invention provides a computer program product comprising instructions which, when the program is executed by a computer, cause the computer to carry out the one or more methods of in accordance with the present invention.

Embodiments of the First Aspect

Figure 7:
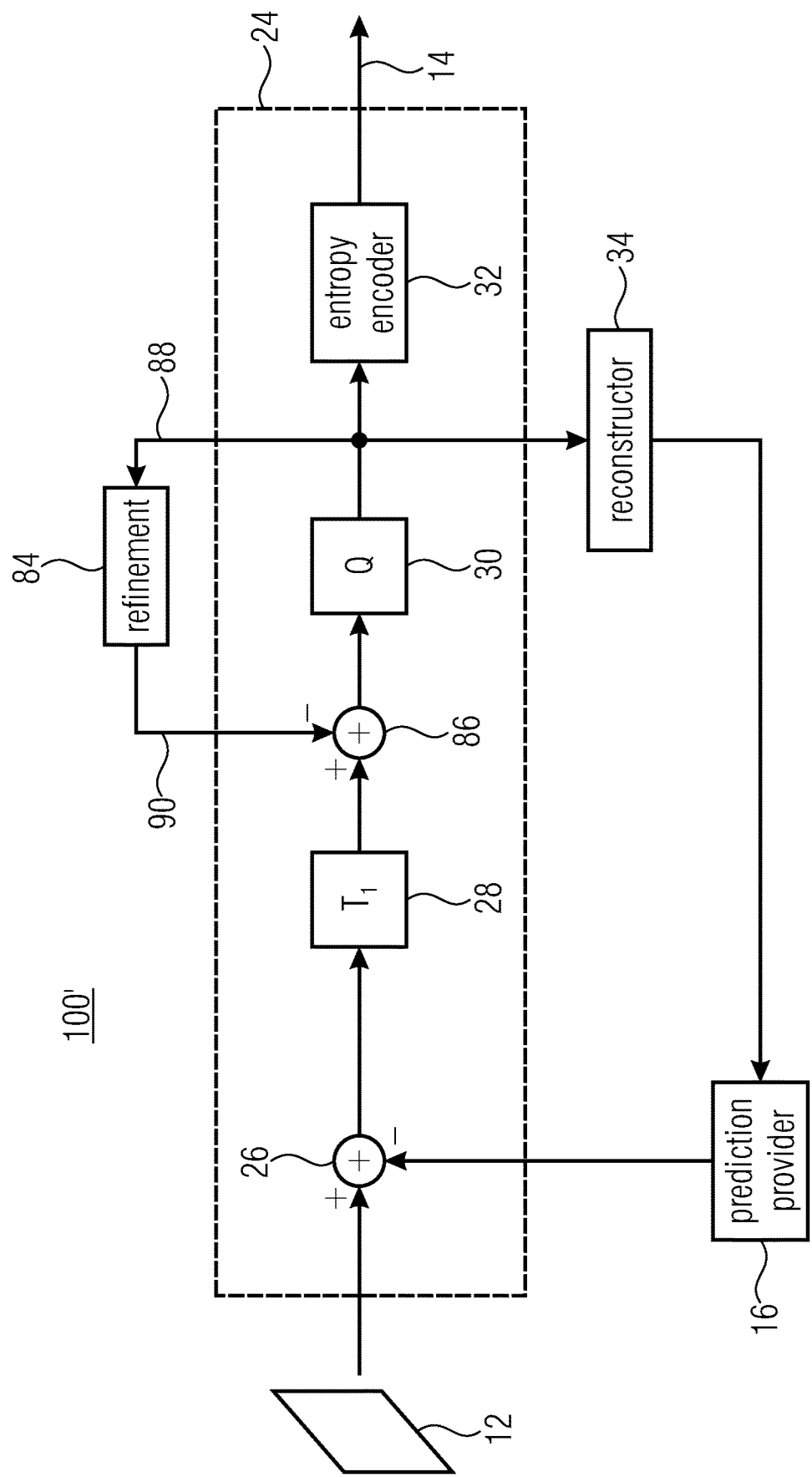
FIG. 7 shows an embodiment of an apparatus for block-based predictive encoding of a picture into a data stream in accordance with an embodiment of the inventive approach.

Embodiments of the first aspect of the inventive approach are now described. In accordance with the first aspect the block-based predictive encoder/decoder applies a refinement process to the residual signal. FIG. 7 shows an embodiment of an apparatus 100' for block-based predictive encoding of a picture 12 into a data stream 14 implementing the first aspect of the inventive approach. Elements of the encoder already described with reference to FIG. 1 have associated the same reference signs and are not described in detail again.

The apparatus 100' comprises a prediction provider 16 and an encoding stage 24. The encoding stage 24 may comprise an adder 26, a transformer 28 and a quantization stage 30. The inverting input of the adder 26 is connected to an output of the prediction provider 16 and the non-inverting input of the adder 26 receives the signal to be encoded, i.e., the picture 12. The encoding stage 24 may further comprise an entropy encoder 32 connected between the output of the quantizer 30 and an output of the apparatus 100' at which the coded data stream 14 representing the picture 12 is output. The apparatus 100' may comprise, connected between the encoding stage 24 and the prediction provider 16, the reconstruction stage 34, which provides to the prediction provider 16 previously encoded portions, i.e., portions of the picture 12 or a video to which the picture 12 belongs, which have previously been encoded by the encoder 100', and in particular, a version of these portions which is reconstructable at the decoder side even taking the coding loss into account introduced by the quantization within the quantization stage 30. The reconstruction stage 34 may have a structure as described with reference to FIG. 1. The apparatus 100' comprises a refinement block or stage 84 connected between the output of the quantizer 30 and an additional adder 86 of the encoding stage 24. The refinement block 84 receives the residual signal 88 from the quantizer 30 and provides to the inverting input of the additional adder 86 a modified version 90 of the residual signal. The encoding block 24 encodes the predetermined block into the data stream 14 on the basis of the modified version 90 of the residual signal.

Figure 8A:
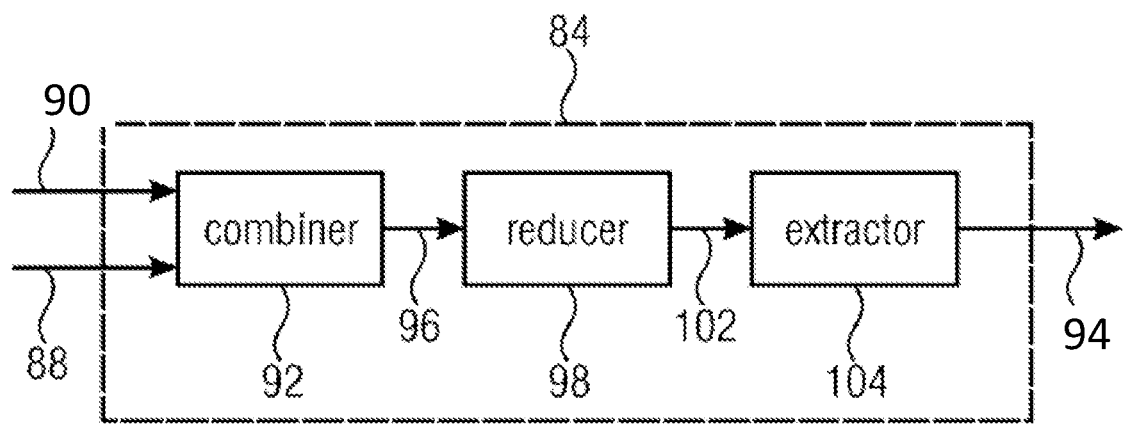

FIG. 8 illustrates embodiments for implementing the refinement block 84 in FIG. 7. In accordance with an embodiment illustrated in FIG. 8a, the refinement block 84 includes a combiner 92 which receive the residual signal 88 and a reference signal 90. The combiner 92 combines the residual signal 88 and a reference signal 90 for the predetermined block so as to obtain a first spectrum 96, also referred to as a first set of coefficients. A reducer 98 coupled to the combiner 92 performs thresholding on the first spectrum 96 to obtain a second spectrum 102, also referred to as a second set of coefficients so that spectral coefficients below a threshold value are set to a pre-defined value. The second spectrum 102 is received at an extractor 104 which obtains from the second spectrum 102 the modified version 94 of the residual signal 88. In accordance with embodiments, the reference signal comprises previous residual signals of a neighborhood of the predetermined block. In accordance with further embodiments, the predetermined block of the picture is an interpredicted block.

Embodiments of the Second Aspect

Figure 8B:
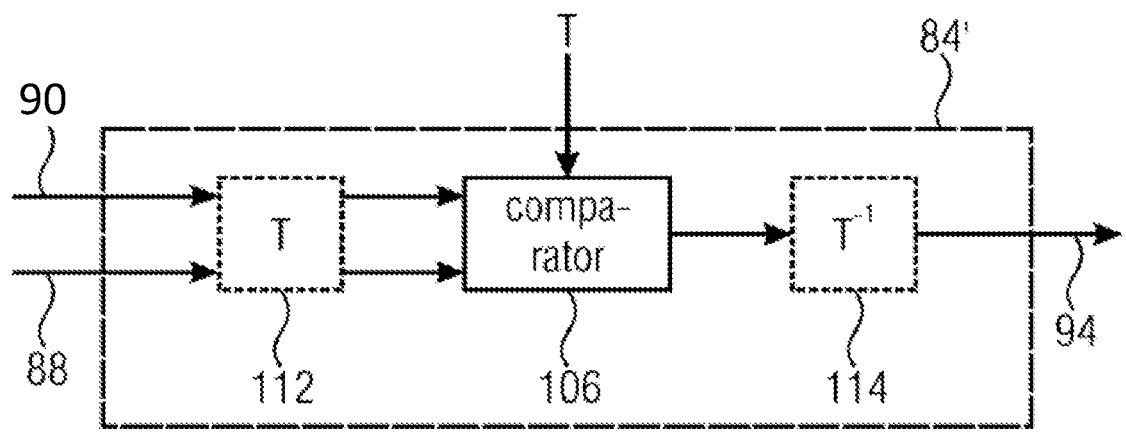

FIG. 8B illustrates another embodiment for implementing the refinement block 84 of FIG. 7. FIG. 8B illustrates an embodiment of the second aspect of the inventive approach providing the refinement without a combination of the employed signal and the reference signal. The refinement block 84' includes a comparator 106 which receives the residual signal 88 to be modified and the reference signal 90. The comparator 106 compares, for each frequency position or coefficient position within the reference signal 94 for the predetermined block, a spectral coefficient against a threshold value T. If the spectral coefficient value is below the threshold, the comparator 106 sets, at the corresponding coefficient position within the residual signal 88 to be modified, the spectral coefficient to the predefined value, thereby obtaining the modified residual signal 94.

Figure 8C:
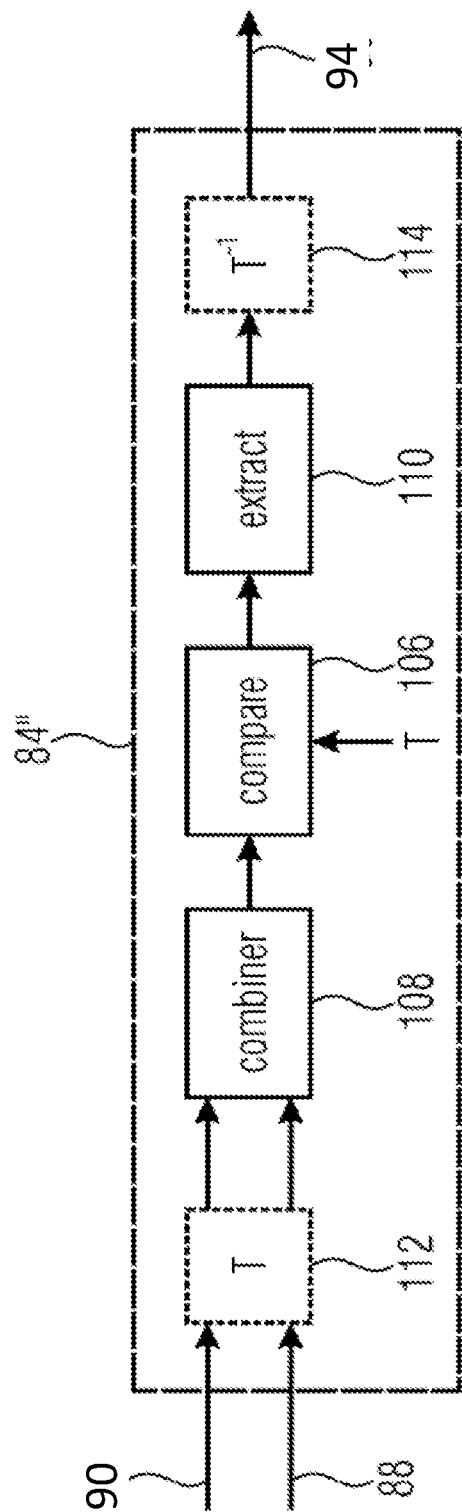

FIG. 8c illustrates another embodiment for implementing the refinement block 84 of FIG. 7. FIG. 8c illustrates another embodiment of the second aspect of the inventive approach providing the refinement using a combination of the employed signal and the reference signal. The refinement block 84" includes, in addition to the comparator 106 a combiner 108 receiving the residual signal 88 to be modified and the reference signal 90. The combiner 108 combines the residual signal 88 and the reference signal 90 so as to obtain a first spectrum or a first set of coefficients that is applied to the comparator 106. The comparator 106 compares, for each coefficient position within the reference signal 90 for the predetermined block, a spectral coefficient against a threshold value T. If the spectral coefficient value is below the threshold, the comparator 106 sets, at the corresponding coefficient position within the first spectrum, the spectral coefficient to the predefined value, thereby obtaining a modified first spectrum or a modified first set of coefficients. The modified first spectrum is applied to extractor 110 which obtains from the modified first spectrum the modified residual signal 94.

In accordance with further embodiments, the refinement blocks 84' or 84" depicted in FIG. 8B and FIG. 8C may be employed in the encoder of FIG. 1. The refinement blocks 84' or 84" may replace blocks 18, 20 and 22 and receive in such embodiments the prediction signal from the predictor 16. In such embodiments, the prediction signal 88 and the reference signal 94 received at the refinement block are in the spatial domain, and the refinement blocks may further include an optional spectral decomposer or transformer 112 to transform the prediction signal 88 to be modified and the reference signal 90 into the frequency domain. In addition, the signal output by the comparator 106 or the extractor 110 may be applied to a spectral composer or transformer 114 to obtain the modified prediction signal 94 in the spatial domain.

Embodiments of the Third Aspect

Figure 9:
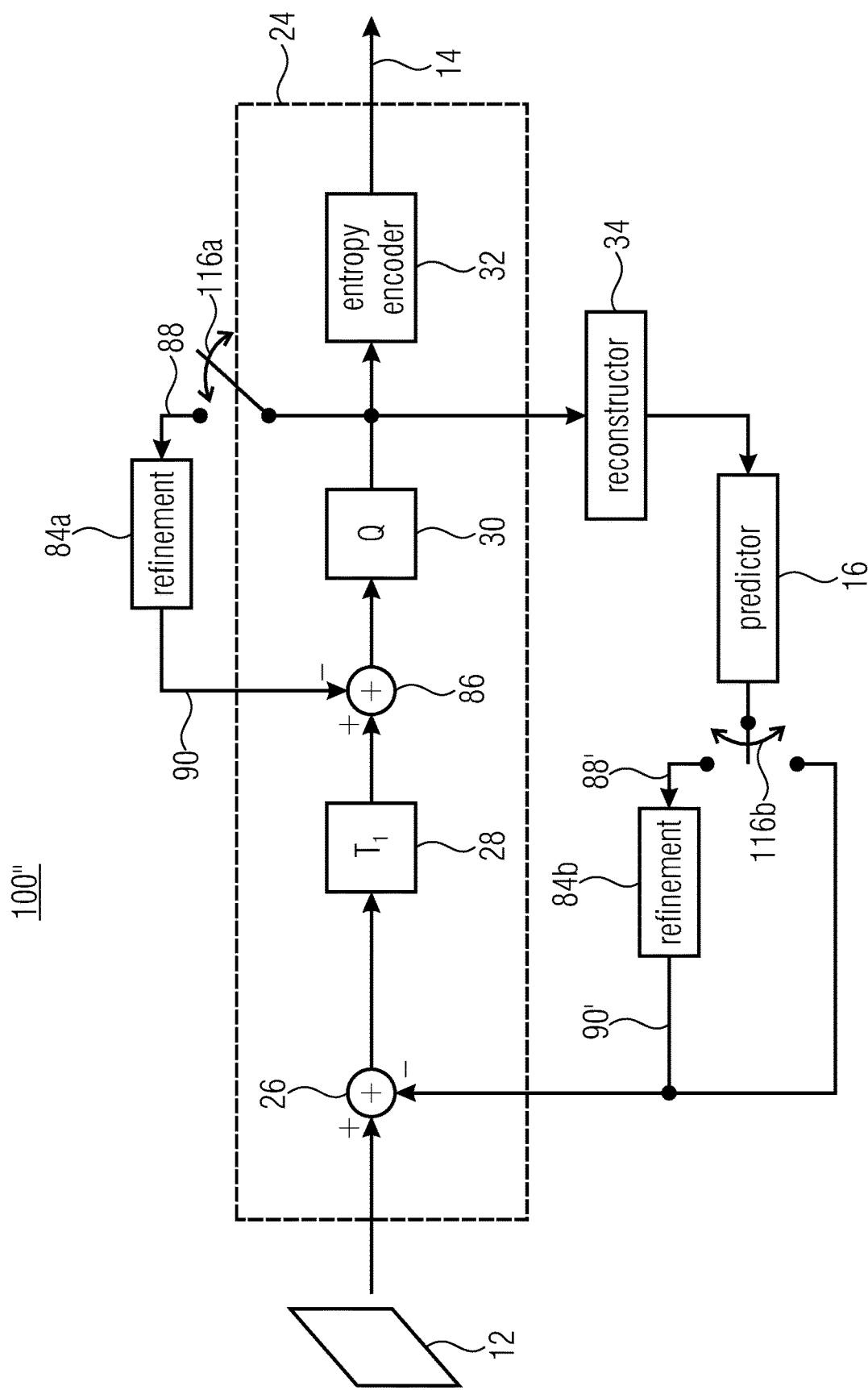
FIG. 9 shows an embodiment of an apparatus for block-based predictive encoding of a picture into a data stream in accordance with another embodiment of the inventive approach.

Embodiments of the third aspect of the inventive approach are now described. In accordance with the third aspect the a block-based predictive encoder/decoder uses in combination or selectively a prediction signal refinement, e.g., for intra coding, and a residual signal refinement, e.g., for inter coding. FIG. 9 shows an embodiment of an apparatus 100" for block-based predictive encoding of a picture 12 into a data stream 14 implementing the third aspect of the inventive approach. Elements of the encoder already described with reference to FIG. 1, FIG. 7 and FIGS. 8A-C have associated the same reference signs and are not described in detail again.

The apparatus 100" comprises a first refinement block 84a, e.g., the refinement block of FIG. 7, connected between the output of the quantizer 30 and the additional adder 86 of the encoding stage 24, and a second refinement block 84a connected between the output of the predictor 16 and the additional adder 86 of the encoding stage 24. The respective refinement blocks 84a, 84b may be coupled directly or selectively to the output of the quantizer 30 and the predictor 16, respectively. In case the refinement blocks 84a, 84b are coupled selectively, the apparatus 100" comprises respective selectors 116a, 116b coupled between the respective refinement blocks 84a, 84b the output of the quantizer 30 and the predictor 16, respectively. In accordance with embodiments, the apparatus 100" may continuously employ the prediction signal refinement and the residual signal refinement (no selector is needed). In accordance with other embodiments, the apparatus 100" may continuously employ the prediction signal refinement or the residual signal refinement and selectively employ, e.g., via one of the selectors, the other refinement, the residual signal refinement or the prediction signal refinement. In accordance with yet other embodiments, the apparatus 100" may selectively employ, e.g., via the selectors, one or both of the refinements, the residual signal refinement and/or the prediction signal refinement.

The first refinement block 84a may be implemented according to the embodiments of FIG. 8A to FIG. 8C. The second refinement block 84b may be implemented according to the embodiments of FIG. 8B and FIG. 8C. In accordance with other embodiments, the second refinement block 84b may be implemented according to FIG. 1, e.g., by blocks 18, 20 and 22 as described above in more detail.

Figure 10:
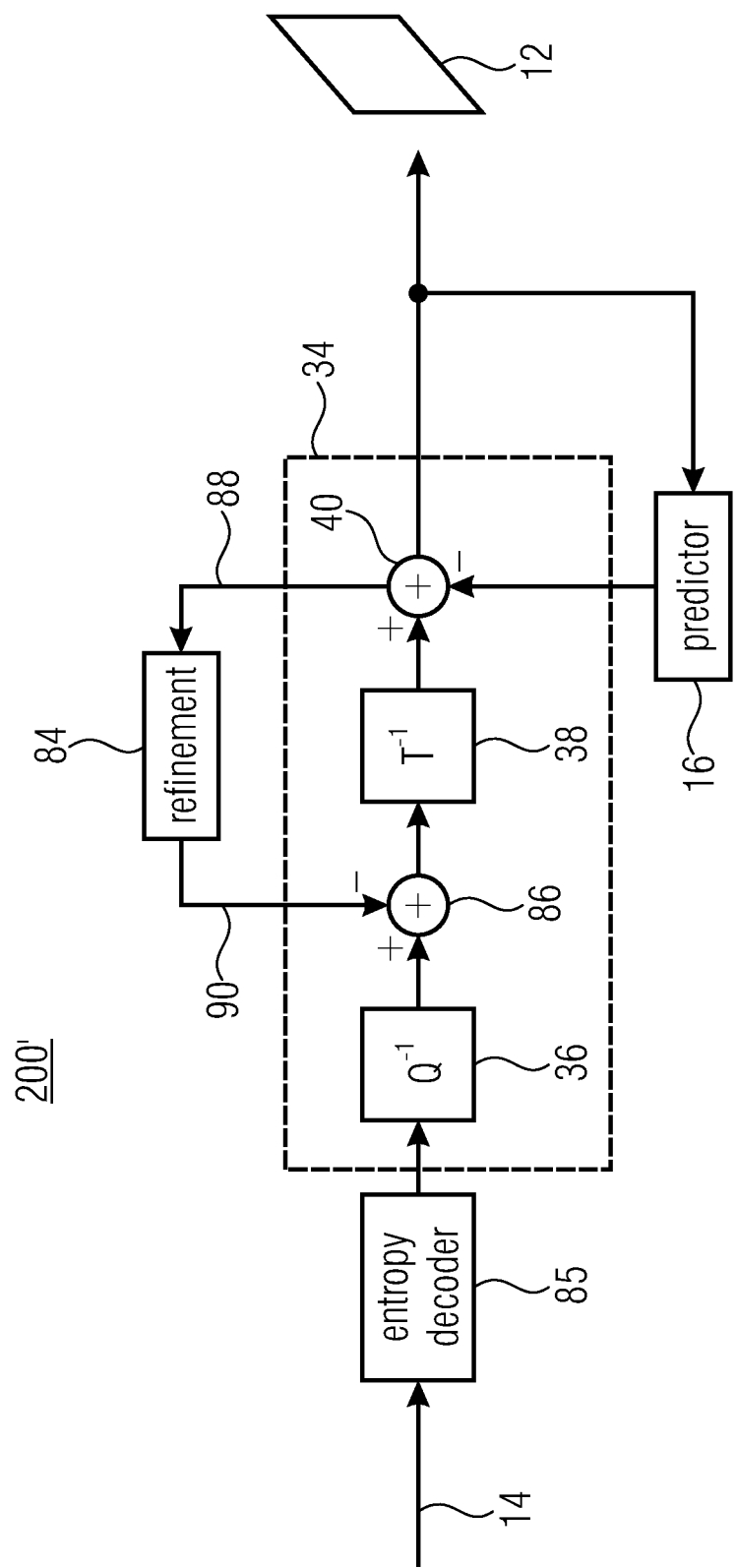
FIG. 10 shows a block diagram of a decoding apparatus fitting to the apparatus of FIG. 7.

FIG. 10 shows an apparatus 200' for block-based predictive decoding a picture 12, a reconstructed version of the picture 12, from the data stream 14 which fits or corresponds to the apparatus of FIG. 7. Largely, the internal structure of the decoder 200' of FIG. 10 coincides with the internal structure of the encoder 100' as far as their task with respect to those coding parameters is concerned, which are finally selected by the apparatus 100' of FIG. 7. Accordingly, FIG. 10 shows that the apparatus 200' comprises a prediction loop including the predictor 16 and the refinement block 84 of FIG. 7. As the reconstructed portions of the signal to be reconstructed, i.e., the picture 12, is obtained at the output of the adder 40, and this output represents the output of the decoder 200'. Optionally, picture improving modules, such as post-filters may be provided in front of the output.

FIG. 11 shows an apparatus 200" for block-based predictive decoding a picture 12, a reconstructed version of the picture 12, from the data stream 14 which fits or corresponds to the apparatus of FIG. 9. Largely, the internal structure of the decoder 200" of FIG. 11 coincides with the internal structure of the encoder 100" as far as their task with respect to those coding parameters is concerned, which are finally selected by the apparatus 100" of FIG. 9. Accordingly, FIG. 11 shows that the apparatus 200" comprises a prediction loop including the predictor 16 and the first and second refinement blocks 84a, 84b as well as the optional selectors 116a, 116b of FIG. 9. As the reconstructed portions of the signal to be reconstructed, i.e., the picture 12, is obtained at the output of the adder 40, and this output represents the output of the decoder 200". Optionally, picture improving modules, such as post-filters may be provided in front of the output.

The refinement blocks 84, 84a, 84b may be implemented as described in detail above.

Embodiments of the Fourth Aspect

The embodiments described above with reference to FIG. 6 to FIG. 11 and also the noise reducer 20 of the encoder/decoder of FIG. 1 and FIG. 5 operate on the basis of a threshold for reducing spectral coefficient during the refinement process. In the following, embodiments of the fourth aspect of the inventive approach are described, which relates to the selection of the thresholds used for reducing spectral coefficients in the refinement process.

As explained above, the refinement process modifies the employed signal, like the prediction signal or the residual signal, or a combination of the employed signal and a reference signal, the combined signal, to remove irrelevant information and obtain the modified employed signal. The modified employed signal results in less rate-distortion cost. When using an extension of the current block as the reference signal, in accordance with embodiments, the employed and reference signals or the combined signal are transformed into the frequency domain. The transform may comprise a Hadamard transform, a DCT or Wavelet approximations. Signal parts of the employed and the reference signal that are correlated or relevant are extracted by removing uncorrelated or irrelevant signal parts, e.g., by setting coefficient positions having relatively low absolute amplitudes to zero. The modified combined signal is transformed back into the spatial domain, and the employed signal is extracted from the combined signal. In this embodiment and in other embodiments the decision on whether a specific transform coefficient should be quantized to zero uses a threshold or a threshold value. In accordance with embodiments of the fourth aspect, the threshold may be derived as follows.

The transform coefficients may be known, either due to a transform of the employed signal, like the prediction signal, or the combined signal into the frequency domain or because the employed signal, like the residual signal, is already in the frequency domain, and each absolute transform coefficient forms a limit that defines the threshold value t, and transform coefficients in the combined signal or the employed signal which are below or equal to the threshold value may be quantized to a predefined value, e.g., by reducing the transform coefficients by an amount equal to the threshold value or a fraction of the threshold value. In accordance with embodiments, the predefined value may be zero. For example, the ordered absolute coefficients may be as follows for a 4×4 block. The 4×4 block may represent a combined signal including the employed or currently processed signal in the lower right block and the reference signal in the remaining blocks.

$t \in (81,32,16,12,11,9,7,2,1,1,1,1,0,0,0,0)$

The candidates for the threshold value t are the absolute coefficient values. In accordance with embodiments, duplicates and entries that are already zero may be removed from the candidate list above, resulting in the following candidate list having only nine candidates left.

$t \in (81,32,16,12,11,9,7,2,1)$

The threshold value actually used for the currently processed block may be determined by applying some or all of the threshold values from the candidate list and evaluating which threshold value yields the best result. The threshold value finally used may be denoted by an index of the candidate list which may be derived at the decoder side, and the index is transmitted in the bitstream. In the above example, nine threshold values are possible and this results in the same number of indices.

The indices may be binarized using Truncated Unary code, and similar to the signalization of the reference signal, a single context model may be used or a dedicated context model for each bin position.

Since cost reduction is commonly not proportional to a cost increase for the side information, embodiments may employ a trade-off configuration. For example, for larger block sizes, the number of varying coefficients may be large resulting in excessive signaling overhead. To address this, embodiments may apply quantization. The actual quantization step size may be signaled in the bitstream or the header syntax. The quantization step size may also depend on the picture quantization parameter, e.g., by a constant factor, like 0.5. For the above example, when the quantization step is equal to five, the resulting candidate list is as follows.

$t \in (16,6,3,2,1)$

Furthermore, the candidate list length may be limited, either externally or internally depending on the prediction mode and/or the quantization parameter. The candidate list may keep the smaller threshold values and remove the larger threshold values. For the above example, when the candidate list length should be at maximum equal to three, the values 16 and six are removed from the list. The decision which threshold values to keep may be made either by a fixed scheme or depending on the characteristics/distribution of the transform coefficients of the combined signal and the reference signal.

Embodiments of the Fifth Aspect

The embodiments described above with reference to FIG. 6 to FIG. 11 and also the encoder/decoder described with reference to FIG. 1 to FIG. 5 operate on the basis of a reference signal comprising reconstructed samples or reconstructed residuals from a neighborhood of the currently predicted sample or block, e.g., from an extension of the currently predicted block in the picture. In the following, embodiments of the fifth aspect of the inventive approach are described, which relates to selecting the neighborhood of the currently predicted block from which the reference signal, like the reconstructed samples or reconstructed residuals, are obtained for the refinement process.

In accordance with embodiments, the reference signal is combined with the employed signal so as to obtain the combined signal, and embodiments for selecting of the neighborhood are now described in the context of such a combined signal, namely the derivation of the combined signal. On the other hand, it is noted that the embodiments described below may be equally applied for the above described approaches providing the refinement without a combination of the employed signal and the reference signal. Also in such approaches, the neighborhood defining the reference signal may be selected as described below.

The following process description may be applied both to the refinement of the prediction signal and the residual signal since the difference between the two signals is a linear operation only. As a reference signal, either the reconstructed samples or the reconstructed residuals may be employed. At the encoder side, when applying the refinement of the residual signal the unquantized residuals may be employed resulting in an asymmetric operation between the encoder and the decoder. When applying the refinement of the prediction signal the operation is symmetric. The location of the reference signal may be derived without signaling or may be forward-adaptive or explicitly specified in the bitstream. FIGS. 12A-C illustrate embodiments for the areas from which the reference signals may be obtained, wherein the white area denotes the current block, the shaded areas denote the reference signal that is used for the combination, and the black-filled areas denote samples that are not considered. FIG. 12A illustrates an embodiment in accordance with which the reference signal is an extension of the current block without offset, FIG. 12B illustrates an embodiment in accordance with which the reference signal is the extension to the top of the current block, and FIG. 12C illustrates an embodiment in accordance with which the reference signal is an extension having an offset relative to the current block.

For example, as is illustrated in FIG. 12A, the surrounding spatial areas of the current block may be used as the reference signal. In the case of HEVC, the processing order for the partitions is depth-first Z-order, i.e., the above and the left reconstructed samples are available at the decoder side. In accordance with this embodiment, the current block may be extended so that the final block size is twice the current block size. In accordance with other embodiments, a different final block size may be defined, and any final block size is suitable as long as the reconstructed samples are available.

In accordance with other embodiments, not all reconstructed samples/residuals on the left or above may be correlated with the current block. In such embodiments, only the spatial areas above, as illustrated in FIG. 12B, or left of the current block may be used.

In accordance with yet other embodiments, the reference signal may be specified, e.g., by an offset relative to the current block, as is illustrated in FIG. 12C. Such a configuration may be detected using backward-adaptive techniques and/or may be forward-adaptive or explicitly specified in the bitstream. The configuration may vary depending on the prediction mode, i.e., either intra or inter prediction, and the quantization parameter.

When a block employs intra prediction or intra-predicted blocks, the residual energy is usually higher than for inter prediction. For intra slices, i.e., the only allowed prediction mode is intra, the neighboring residual signals may have higher energy than for inter slices. In such an environment, a configuration may employ the neighboring reconstructed samples as the reference signal and the current prediction signal as the employed signal. Alternatively, the reference signal may specified, e.g., by an offset relative to the current block, see FIG. 12C. The offset may be signaled as an in-picture motion vector so that the reference signal includes samples that are available at the decoder. Such a configuration may be suitable for regular textures having repeating patterns.

Since the reconstruction quality suffers from higher quantization steps, the candidate space may be limited depending on the selected quantization parameter. For example, a candidate list including predefined motion vectors may be configured so that a length of the candidate list depends on the selected quantization parameter. A straightforward configuration without offset may be the extension of the current block to the left so that the total width is N and to the top so that the total height is M. When employing a refinement that includes transforms, then both N and M are advantageously even.

In any case, the size of the extension is determined, either backward-adaptive or forward-adaptive, or a combination of both. Assuming that the sizes are listed in a candidate list, an index may be transmitted in the bitstream which denotes an increase in size so that a next available extension size is selected. For example, a next available size may depend on the configuration of the refinement process. In accordance with an embodiment the configuration may simply extend the currently processed block to the next available transform in both directions.

As mentioned above, some embodiments of the refinement process, e.g., when operating on the basis of neighboring reconstructed samples as the reference signal and the current prediction signal as the employed signal, employ one or more transforms. In such embodiments, a next available size may match the available transforms, and an advantageous configuration may simply extend the currently processed block to the next available transform size in both directions, i.e., an increment of the transmitted index results in an increase for both sizes, like to the left and to the top in FIGS. 12A-C, to the next available transform.

In accordance with embodiments, the combined signal may be sampled up and down, respectively, before the refinement step to better suit an available transform. The sampling is reverted after the refinement is completed.

In accordance with embodiments, the number of indices may be limited, either externally configured or internally, due to the limitations on the available number of samples when operating close to the edge of the frame, or may be coupled to the quantization parameter. The size index may be binarized using Truncated Unary code, and each bin position may be coded using a dedicated context model, or a single context model may be employed.

In accordance with yet further embodiments, instead of increasing the area surrounding the current block, another area having the same size may be specified. The signaling may be done either by an in-picture motion vector or by pointing to the other block or area that has been processed earlier. In this setting, the reference signal has the same size as the employed signal.

Although it has been described that the intra-prediction employs the neighboring reconstructed samples as the reference signal and the current prediction signal as the employed signal the use, it is noted that the present invention is not limited to this. Rather, in accordance with other embodiments the intra-prediction may employ the neighboring reconstructed residuals as the reference signal and the current residual signal as the employed signal.

When a block employs inter prediction or inter-predicted blocks, the neighboring signal may be used as for the intra-predicted case described above. However, in accordance with other embodiments employing inter prediction or inter-predicted blocks, due to different signal characteristics, the configuration may be modified so that the neighboring residual signals are used as the reference signal and the current residual signal is used as the employed signal. In accordance with embodiments, rather than using residual signals from areas, like those depicted in FIG. 12A-C, another setting may be used which employs as reference signal the neighboring signals that surround a reference block instead of the current block. This configuration is illustrated in FIGS. 13A-B, and FIG. 13A illustrates the use of an extension of a reference block instead of the current block for inter-predicted blocks, and FIG. 13B illustrates an embodiment in which the reference signal completely surrounds the reference block.

The inter configuration may be considered as an extension to the intra configuration so that its configuration is available in addition to the intra configuration when operating in inter slices. Additionally, the combination of both intra and inter configuration is possible (see FIG. 9). Both reference signals may be combined and subsampled first so that a new reference signal is generated. The signaling may be configured along to the intra configuration as described above.

Embodiments of the Sixth and Seventh Aspects

Some of the embodiments described above with reference to FIG. 6 to FIG. 11 and also the encoder/decoder described with reference to FIG. 1 to FIG. 5 subject the combined signal to thresholding in the frequency domain followed by a re-transform into the spatial domain. In the following, embodiments of the sixth aspect of the inventive approach, which relate to a spectral composing of the modified signal only by applying a partial re-transform of the combined signal, as well as embodiments of the seventh aspect of the inventive approach, which relate to the spectral composing of the modified signal disregarding coefficients below a threshold, but not set to zero or to another reduced value, are described.

In accordance with the sixth aspect, the employed signal may be directly derived from the modified combined signal in the transformed domain, e.g., without a full reconstruction of the modified combined signal in the spatial domain, but e.g., by a partial reconstruction.

In accordance with the seventh aspect, the coefficient positions having relatively low absolute amplitudes are not set to zero before transform, but just not considered when performing a partial transform.

Embodiments of the Eighth Aspect

The embodiments described above with reference to FIG. 6 to FIG. 11 and also the encoder/decoder described with reference to FIG. 1 to FIG. 5 apply the described refinement process to the employed signal and information about the refinement process are signaled. In the following, embodiments of the eighth aspect of the inventive approach, which relate to the signaling of the refinement information, like a level of signaling refinement information.

When transmitting side information for the configuration of the refinement process, there are several options on which level this information may be send. The information may be send for each partitioning structure separately which results in higher costs but in higher accuracy in the sense that the refinement may be more locally adapted.

Another option is to send the information on a higher level that contains several partitioning structures. This results in lower costs but may limit the possible adaptivity of the refinement process.

In order to reduce the complexity, one may employ an iterative strategy. For example, the choice which refinement parameters are selected may be done on base of a fixed grid (containing several partitioning structures). Then, the grid may be recalculated considering the application of the refinement process using the chosen parameters. This iteration may be repeated several times. The choice if the refinement process is applied on a certain partitioning structure may be tested and send locally.

Further Embodiments

In the embodiments described above, reference has been made to a spectral composer that spectrally composes a signal, or a spectral decomposer that spectrally decomposes a signal. It is noted that in accordance with the inventive approach the spectral composer may apply any spectral base transform to the signal, like a Singular Value Decomposition (SVC), a FFT or a DCT. Likewise, the spectral decomposer may apply any spectral base re-transform to the signal.

It is further noted that the inventive approach is not limited to the use of a spectral decomposer or a spectral composer, or to the use of spectral coefficients. In accordance with embodiments, any decomposer performing a transform to obtain coefficients or any composer performing a re-transform may be used.

In the embodiments described above, the thresholding is against a threshold value, also referred to as hard thresholding. It is noted that in accordance with other embodiments of the inventive approach also a soft thresholding may be applied. Moreover, setting the coefficients by the thresholding to the predefined value may include (a) setting a coefficient to a certain value that depends on the threshold value, e.g., a preset fraction of the threshold value, like half the threshold, or a preset absolute value, like zero, and/or (b) reducing a coefficient by a certain amount, e.g., by moving a value of the coefficient towards a preset value, like zero, e.g., by an amount equal to the threshold value or to a fraction of the threshold, like half the threshold.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 14:
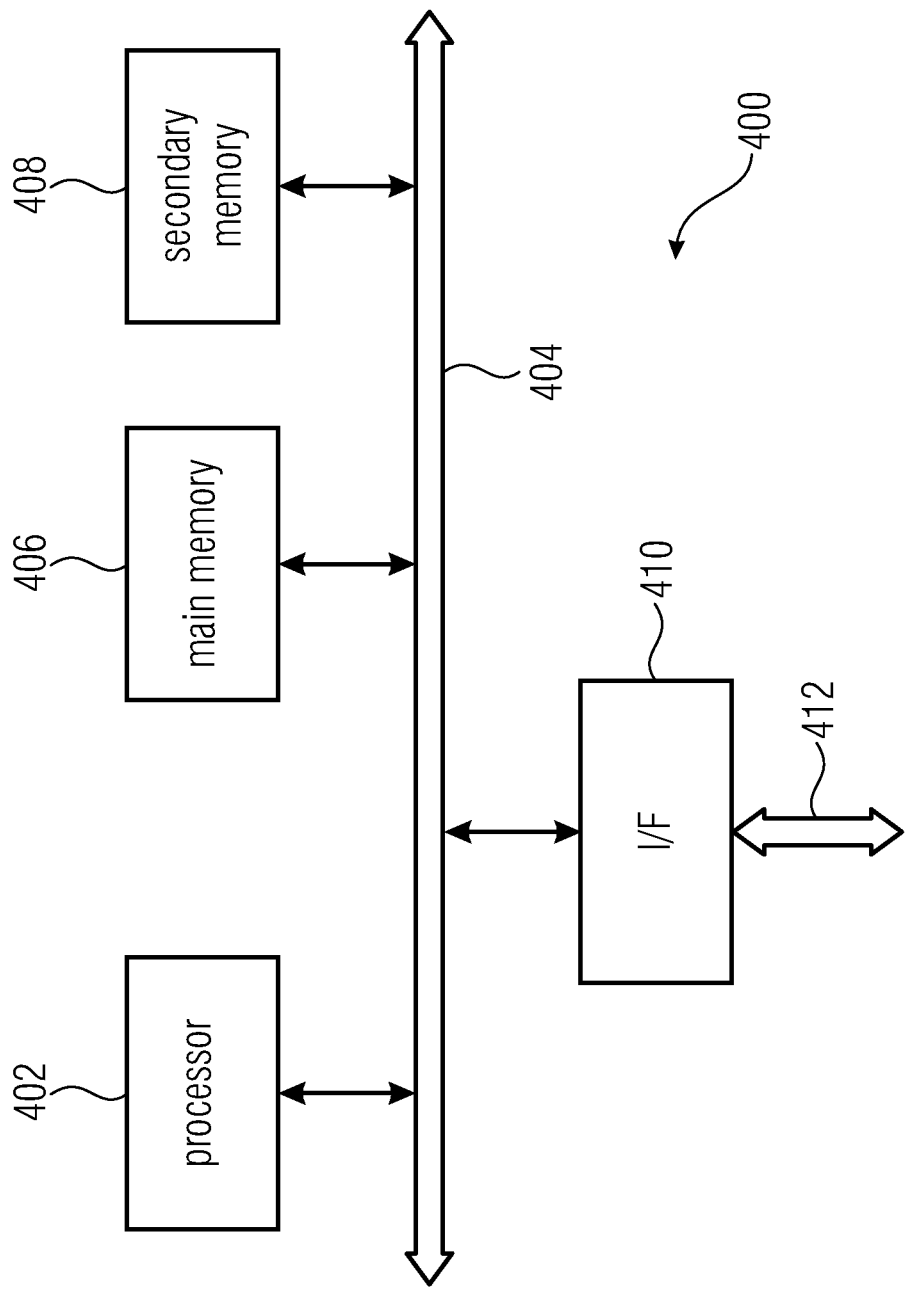
FIG. 14 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 14 illustrates an example of a computer system 400. The units or modules as well as the steps of the methods performed by these units may execute on one or more computer systems 400. The computer system 400 includes one or more processors 402, like a special purpose or a general purpose digital signal processor. The processor 402 is connected to a communication infrastructure 404, like a bus or a network. The computer system 400 includes a main memory 406, e.g., a random access memory (RAM), and a secondary memory 408, e.g., a hard disk drive and/or a removable storage drive. The secondary memory 408 may allow computer programs or other instructions to be loaded into the computer system 400. The computer system 400 may further include a communications interface 410 to allow software and data to be transferred between computer system 400 and external devices. The communication may be in the from electronic, electromagnetic, optical, or other signals capable of being handled by a communications interface. The communication may use a wire or a cable, fiber optics, a phone line, a cellular phone link, an RF link and other communications channels 412.

The terms "computer program medium" and "computer readable medium" are used to generally refer to tangible storage media such as removable storage units or a hard disk installed in a hard disk drive. These computer program products are means for providing software to the computer system 400. The computer programs, also referred to as computer control logic, are stored in main memory 406 and/or secondary memory 408. Computer programs may also be received via the communications interface 410. The computer program, when executed, enables the computer system 400 to implement the present invention. In particular, the computer program, when executed, enables processor 402 to implement the processes of the present invention, such as any of the methods described herein. Accordingly, such a computer program may represent a controller of the computer system 400. Where the disclosure is implemented using software, the software may be stored in a computer program product and loaded into computer system 400 using a removable storage drive, an interface, like communications interface 410.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for block-based predictive decoding of a picture, the apparatus comprising:
   a processor and memory, the processor configured to:
   decode, from a data stream, an index and a residual signal for a current block of the picture, the index indicating a threshold value for the current block, the residual signal for correcting a prediction error of a prediction signal that is derived for the current block;
   modify an employed signal comprising at least one of the prediction signal and the residual signal, wherein the modified employed signal is obtained by:
   comparing, for each coefficient position within a reference signal for the current block, a respective reference signal coefficient against the threshold value, and
   when the respective reference signal coefficient is below the threshold value, setting a coefficient of the employed signal at that coefficient position to a predefined value; and
   decode the current block from the data stream based on the modified employed signal.

2. The apparatus of claim 1, wherein the processor is further configured to:
   combine the employed signal and the reference signal so as to obtain a first set of coefficients;
   set, at the corresponding coefficient position within the first set of coefficients, the coefficient to the predefined value, to obtain a modified first set of coefficients; and obtain from the modified first set of coefficients the modified employed signal.

3. The apparatus of claim 2, wherein the processor is further configured to:
perform a transform on a region composed of the prediction signal and the reference signal so as to obtain a first set of coefficients of the region; and
subject the modified first set of coefficients to a re-transform so as to obtain a modified version of the region including the modified prediction signal.

4. The apparatus of claim 1, wherein the reference signal comprises a neighboring reconstructed residual.

5. The apparatus of claim 1, wherein the threshold value is based on a quantization parameter associated with the residual signal.

6. A method for block-based predictive decoding of a picture, comprising:
decoding, from a data stream, an index indicating a threshold value and a residual signal for a current block of the picture, the residual signal correcting a prediction error of a prediction signal that is derived for the current block of the picture;
modifying an employed signal comprising at least one of the prediction signal and the residual signal, wherein the modified employed signal is obtained by:
comparing, for each coefficient position within a reference signal for the current block, a respective reference signal coefficient against the threshold value, and
when the respective reference signal coefficient is below the threshold value, setting a coefficient of the employed signal at that coefficient position to a predefined value; and
decoding the current block from the data stream based on the modified employed signal.

7. The method of claim 6, wherein the reference signal comprises a neighboring reconstructed residual.

8. The method of claim 6, wherein the threshold value is based on a quantization parameter associated with the residual signal.

9. An apparatus for block-based predictive encoding of a picture, the apparatus comprising:
a processor and memory, the processor configured to:
encode a residual signal for a current block of the picture and an index indicating a threshold value for the current block into a data stream, the residual signal for correcting a prediction error of a prediction signal for the current block;
modify an employed signal comprising at least one of the prediction signal and the residual signal, wherein the modified employed signal is obtained by:
comparing, for each coefficient position within a reference signal for the current block, a respective reference signal coefficient against the threshold value, and
when the respective reference signal coefficient is below the threshold value, setting a coefficient of the employed signal at that coefficient position to a predefined value; and
encode the current block to the data stream based on the modified employed signal.

10. The apparatus of claim 9, wherein the processor is further configured to:
combine the employed signal and the reference signal so as to obtain a first set of coefficients;
set, at the corresponding coefficient position within the first set of coefficients, the coefficient to the predefined value, to obtain a modified first set of coefficients; and
obtain from the modified first set of coefficients the modified employed signal.

11. The apparatus of claim 10, wherein the processor is further configured to:
perform a transform on a region composed of the prediction signal and the reference signal so as to obtain a first set of coefficients of the region; and
subject the modified first set of coefficients to a re-transform so as to obtain a modified version of the region including the modified prediction signal.

12. The apparatus of claim 9, wherein the threshold value is based on a quantization parameter associated with the residual signal.

13. A method for block-based predictive encoding of a picture, comprising:
encoding a residual signal for a current block of the picture and an index indicating a threshold value for the current block into a data stream, the residual signal for correcting a prediction error of a prediction signal for the current block of the picture;
modifying an employed signal comprising at least one of the prediction signal and the residual signal, wherein the modified employed signal is obtained by:
comparing, for each coefficient position within a reference signal for the current block, a respective reference signal coefficient against the threshold value, and
when the respective reference signal coefficient is below the threshold value, setting a coefficient of the employed signal at that coefficient position to a predefined value; and
encoding the current block to the data stream based on the modified employed signal.

14. The method of claim 13, wherein the threshold value is based on a quantization parameter associated with the residual signal.

* * * * *